(12) United States Patent
Kondo

(10) Patent No.: US 9,979,766 B2
(45) Date of Patent: May 22, 2018

(54) SYSTEM AND METHOD FOR REPRODUCING SOURCE INFORMATION

(75) Inventor: Tetsujiro Kondo, Tokyo (JP)

(73) Assignee: I-CUBED RESERACH CENTER INC., Tokyo (JP)

( * ) Notice: Subject to any disclaimer, the term of this patent is extended or adjusted under 35 U.S.C. 154(b) by 135 days.

(21) Appl. No.: 14/237,765

(22) PCT Filed: Aug. 1, 2012

(86) PCT No.: PCT/JP2012/069543
§ 371 (c)(1),
(2), (4) Date: Feb. 7, 2014

(87) PCT Pub. No.: WO2013/021881
PCT Pub. Date: Feb. 14, 2013

(65) Prior Publication Data
US 2014/0181273 A1 Jun. 26, 2014

(30) Foreign Application Priority Data

Aug. 8, 2011 (JP) .................................. 2011-172948

(51) Int. Cl.
*G06F 15/16* (2006.01)
*H04L 29/06* (2006.01)
(Continued)

(52) U.S. Cl.
CPC .......... *H04L 65/60* (2013.01); *G10H 1/0058* (2013.01); *G10H 2240/175* (2013.01); *G10H 2240/325* (2013.01); *G10L 19/00* (2013.01)

(58) Field of Classification Search
CPC .......... G10H 1/0058; G10H 2240/175; G10H 2240/325; G10L 19/00; H04L 65/60
See application file for complete search history.

(56) References Cited

U.S. PATENT DOCUMENTS 6,161,091 A * 12/2000 Akamine ............ G10L 19/0018
704/207
2002/0133349 A1* 9/2002 Barile .................... G11B 27/34
704/265

(Continued)

FOREIGN PATENT DOCUMENTS

| CN | 101657816 A | 2/2010 |
| JP | 2004-94683 A | 3/2004 |

(Continued)

OTHER PUBLICATIONS

Office Action issued in corresponding Japanese Application No. 2011-172948, dated May 26, 2015.

(Continued)

*Primary Examiner* — Hamza N Algibhah
*Assistant Examiner* — Anh Nguyen
(74) *Attorney, Agent, or Firm* — Troutman Sanders LLP

(57) ABSTRACT

An information reproducing apparatus includes a reproduction source information storage unit that stores reproduction source information which is information for constructing reproduced information, an acquired information receiving unit that receives at least one piece of information respectively from at least one information acquiring apparatus, a reproduced information acquiring unit that constructs reproduced information, using the at least one piece of information received by the acquired information receiving unit and the reproduction source information, and a reproduced information sending unit that sends the reproduced information constructed by the reproduced information acquiring unit to at least one information output apparatus.

17 Claims, 16 Drawing Sheets

(51) Int. Cl.
*G10H 1/00* (2006.01)
*G10L 19/00* (2013.01)

(56) References Cited

U.S. PATENT DOCUMENTS

| | | | | |
|---|---|---|---|---|
| 2004/0054725 A1* | 3/2004 | Moller | G10H 1/0058 | 709/204 |
| 2006/0126452 A1* | 6/2006 | Yamashita | G11B 27/105 | 369/30.23 |
| 2007/0260634 A1* | 11/2007 | Makela | G11B 27/105 | |
| 2008/0190271 A1* | 8/2008 | Taub | G10H 1/0058 | 84/645 |
| 2009/0099836 A1* | 4/2009 | Jacobsen | G06F 17/289 | 704/3 |
| 2010/0005501 A1* | 1/2010 | Stokking | G10H 1/365 | 725/115 |
| 2010/0082725 A1* | 4/2010 | Onishi | H04L 12/2812 | 709/201 |

FOREIGN PATENT DOCUMENTS

| | | |
|---|---|---|
| JP | 2004-325775 A | 11/2004 |
| JP | 2007-178860 A | 7/2007 |
| JP | 2009031357 A | 2/2009 |
| JP | 2010-113278 A | 5/2010 |
| JP | 2010-128482 A | 6/2010 |
| JP | 2011-75652 A | 4/2011 |

OTHER PUBLICATIONS

Japanese Office Action dated Nov. 11, 2014, which issued during prosecution of Japanese Application No. 2011-172948, which corresponds to the present application.
International Search Report, dated Nov. 6, 2012, which issued during the prosecution of International Patent Application No. PCT/JP2012/069543, which corresponds to the present application.
Chinese Office Action issued in corresponding Chinese Patent Application No. 2012800386701.
European Communication dated Mar. 14, 2016, issued in corresponding European Application No. 12821614.0-1910.
Taiwanese Office Action dated Apr. 20, 2016 issued in corresponding Taiwanese Patent Application No. 1011028178.
Chinese Office Action dated Nov. 12, 2015 issued in corresponding Chinese Application No. 201280038670.1.
Summons to attend oral proceedings pursuant to Rule 115(1) EPC dated Jan. 20, 2017 issued in European Patent Application No. 12821614.0.
Communication dated Dec. 1, 2017 issued during the prosecution of European Patent Application 12821614.0.
Notification of Reason for Refusal Korean Patent application dated Dec. 12, 2017 issued during the prosecution of No. 10-2014-7001086 & the English machine translation.

* cited by examiner

SYSTEM AND METHOD FOR REPRODUCING SOURCE INFORMATION

CROSS-REFERENCE TO RELATED APPLICATIONS

This is a U.S. national phase application under 35 U.S.C. § 371 of International Patent Application No. PCT/JP2012/069543, filed on Aug. 1, 2012, and claims benefit of priority to Japanese Patent Application No. JP 2011-172948, filed on Aug. 8, 2011. The International Application was published on Feb. 14, 2013, as International Publication No. WO 2013/021881 under PCT Article 21(2). The entire contents of these applications are hereby incorporated by reference.

TECHNICAL FIELD

The present invention relates to an information system and the like for constructing and outputting new information from information received from one or more remote locations.

BACKGROUND ART

Conventionally, there has been an electronic musical instrument realizing a music session between remote locations, while suppressing a sense of unnaturalness (see Patent Document 1, for example). This is an electronic musical instrument realizing a music session between different locations via a network, including: a transmitting part that transmits input musical sound information based on a person's operation via the network to another location; a receiving part that receives music performance information from an electronic musical instrument for the music session at the other location; a delay part that delays the input musical sound information by a predetermined delay time; and a musical sound generating part that generates and mixes musical sound signals from the input musical sound information delayed by the delay part and the music performance information received by the receiving part; wherein musical sounds based on the musical sound signals from the music performance information are used to provide a music performance timing for the electronic musical instrument.

CITATION LIST

Patent Document

[Patent Document 1] JP 2007-178860A (p. 1, FIG. 1, etc.)

SUMMARY OF INVENTION

Technical Problem

However, such a conventional electronic musical instrument cannot output information obtained by adding a value to information received from one or more remote locations.

Furthermore, a person who is generating information at a remote location cannot be provided with information that is to be output to viewers and the like. Accordingly, for example, a music performer who is giving a music performance at a remote location away from viewers cannot give a music performance while feeling the content that is to be provided to the viewers.

Solution to Problem

A first aspect of the present invention is directed to an information system, including: at least one information acquiring apparatus for acquiring information respectively from at least one acquisition space, which is a space for acquiring information; an information reproducing apparatus for constructing reproduced information associated with a reproduction space, which is different from the acquisition space and is a space that is a target to be reproduced; and at least one information output apparatus for outputting the reproduced information to at least one output space, which is a space for outputting the reproduced information; wherein the information acquiring apparatus includes: an information acquiring unit that acquires information; and an acquired information transmitting unit that transmits the information to the information reproducing apparatus; the information reproducing apparatus includes: a reproduction source information storage unit in which reproduction source information, which is information for constructing reproduced information, can be stored; an acquired information receiving unit that receives at least one piece of information respectively from the at least one information acquiring apparatus; a reproduced information acquiring unit that acquires reproduced information, using the at least one piece of information received by the acquired information receiving unit and the reproduction source information; and a reproduced information sending unit that sends the reproduced information constructed by the reproduced information acquiring unit to the at least one information output apparatus; and the information output apparatus includes: a first reproduced information accepting unit that receives reproduced information from the information reproducing apparatus; and a first reproduced information output unit that outputs the reproduced information received by the first reproduced information accepting unit.

With this configuration, it is possible to output information obtained by adding a value to information received from one or more remote locations.

Furthermore, a second aspect of the present invention is directed to the information system according to the first aspect, including at least two information acquiring apparatuses for acquiring information respectively from at least two acquisition spaces, wherein the information reproducing apparatus includes: an acquired information receiving unit that receives at least two pieces of information respectively from the at least two information acquiring apparatuses; an acquired information output unit that outputs the at least two pieces of information received by the acquired information receiving unit; a reproduced information acquiring unit that acquires reproduced information containing the at least two pieces of information output by the acquired information output unit; and a reproduced information sending unit that sends the reproduced information acquired by the reproduced information acquiring unit to the at least one information output apparatus.

With this configuration, it is possible to output information obtained by synthesizing information received from two or more remote locations.

Furthermore, a third aspect of the present invention is directed to the information system according to the first or the second aspect, wherein the information acquiring apparatus further includes: a second reproduced information accepting unit that receives reproduced information from the information reproducing apparatus; and a second reproduced information output unit that outputs the reproduced information received by the second reproduced information accepting unit; and the reproduced information sending unit of the information reproducing apparatus sends the reproduced information constructed by the reproduced information acquiring unit to the at least one information acquiring apparatus and the at least one information output apparatus.

With this configuration, it is possible to output, to an acquisition space, information similar to reproduced information that is to be output to an output space.

Furthermore, a fourth aspect of the present invention is directed to the information system according to any one of the first to the third aspects, including at least two information acquiring apparatuses, wherein the reproduced information acquiring unit includes: an information synthesizing part that acquires synthesis information, by synthesizing at least two pieces of information received by the acquired information receiving unit; and a reproduced information constructing part that constructs reproduced information, using the synthesis information acquired by the information synthesizing part and the reproduction source information.

With this configuration, it is possible to output information obtained by synthesizing information received from two or more remote locations and adding a value thereto.

Furthermore, a fifth aspect of the present invention is directed to the information system according to any one of the first to the fourth aspects, including at least two information acquiring apparatuses, at least one information reproducing apparatus, one information aggregating apparatus, and at least one information output apparatus, wherein the information aggregating apparatus includes: an acquired information receiving unit that receives at least one piece of information respectively from at least one of the information acquiring apparatuses; a reproduced information collecting unit that receives at least one piece of reproduced information from the at least one information reproducing apparatus; a reproduced information acquiring unit that acquires reproduced information that is to be output, using the at least one piece of information received by the acquired information receiving unit and the at least one piece of reproduced information received by the reproduced information collecting unit; and a reproduced information sending unit that transmits the reproduced information constructed by the reproduced information acquiring unit to the at least one information output apparatus, or to the at least one information output apparatus and the at least two information acquiring apparatuses; and the reproduced information sending unit of the at least one information reproducing apparatus transmits the reproduced information constructed by the reproduced information acquiring unit of the information reproducing apparatus to the information aggregating apparatus.

With this configuration, it is possible to output information obtained by synthesizing information from two or more apparatuses that output information obtained by synthesizing information received from two or more remote locations and adding a value thereto.

Furthermore, a sixth aspect of the present invention is directed to the information system according to the fifth aspect, wherein the information aggregating apparatus further includes a reproduction source information storage unit in which reproduction source information, which is information for constructing reproduced information, can be stored, and the reproduced information acquiring unit of the information aggregating apparatus constructs reproduced information that is to be output, using the reproduction source information, the at least one piece of information received by the acquired information receiving unit, and the at least one piece of reproduced information received by the reproduced information collecting unit.

With this configuration, it is possible to output information obtained by synthesizing information from two or more apparatuses that output information obtained by synthesizing information received from two or more remote locations and adding a value thereto.

Furthermore, a seventh aspect of the present invention is directed to the information system according to any one of the first to the sixth aspects, including at least two information acquiring apparatuses, at least two information reproducing apparatuses, an information synthesizing apparatus, and at least one information output apparatus, wherein the reproduced information sending unit of each of the information reproducing apparatuses transmits the reproduced information constructed by the reproduced information acquiring unit to the information synthesizing apparatus, and the information synthesizing apparatus includes: a reproduced information collecting unit that receives reproduced information from each of the at least two information reproducing apparatuses; a reproduced information synthesizing unit that constructs reproduced information that is to be output, by synthesizing the at least two pieces of reproduced information received by the reproduced information collecting unit; and a third reproduced information sending unit that sends the reproduced information constructed by the reproduced information synthesizing unit to the at least one information output apparatus, or to the at least two information acquiring apparatuses and the at least one information output apparatus.

Advantageous Effects of Invention

The information system according to the present invention can output information obtained by adding a value to information received from one or more remote locations.

DESCRIPTION OF EMBODIMENT

Figure 1:
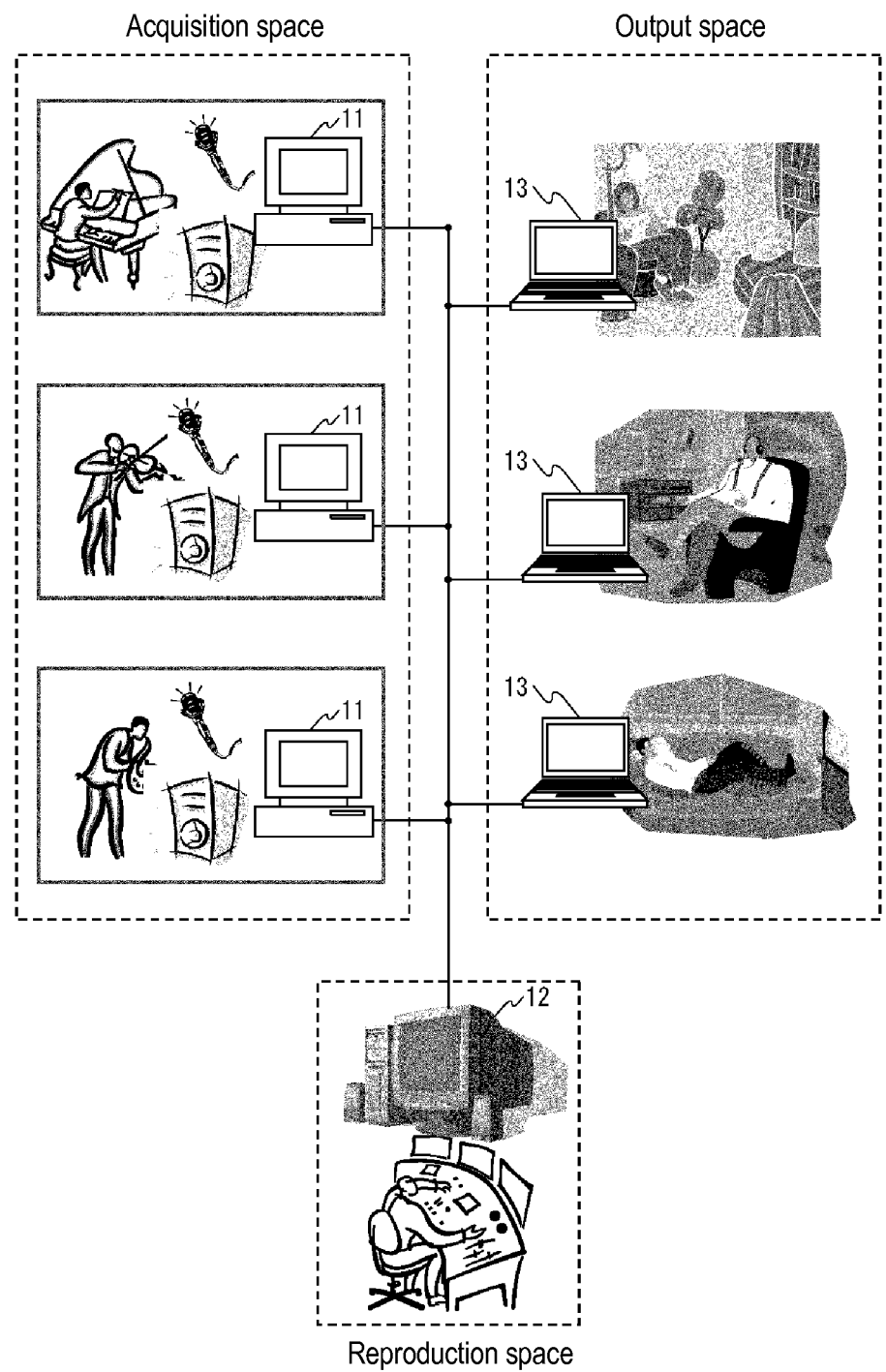
FIG. 1 is a conceptual diagram of an information system in Embodiment 1.

Hereinafter, embodiments of an information system and the like will be described with reference to the drawings. Note that constituent elements denoted by the same reference numerals perform the same operations in the embodiments, and, thus, a description thereof may not be repeated.

Embodiment 1

In this embodiment, an information system will be described that transmits information acquired in one or more acquisition spaces to a reproduction space, acquires reproduced information by adding a value to the transmitted information in the reproduction space, and outputs the reproduced information to one or more output spaces. Herein, the space may be a real location or area, or may be a virtual space. The acquisition space is a space for acquiring information. The acquisition space is preferably a space in which information is generated, such as a space in which a musical instrument is played or a space in which a theatrical performance is given. Furthermore, the reproduction space is a space for acquiring reproduced information, which is information that is to be output. The reproduction space is a space different from the acquisition space, and may be, for example, a virtual space. The reproduced information is, for example, information that a person forming the information system wants to reproduce. Furthermore, the output space is a space to which information is output, and may be referred to as a viewing space in the case of a space for viewing the reproduced information.

FIG. 1 is a conceptual diagram of an information system 1 in this embodiment. The information system 1 includes one or more information acquiring apparatuses 11, an information reproducing apparatus 12, and one or more information output apparatuses 13.

Figure 2:
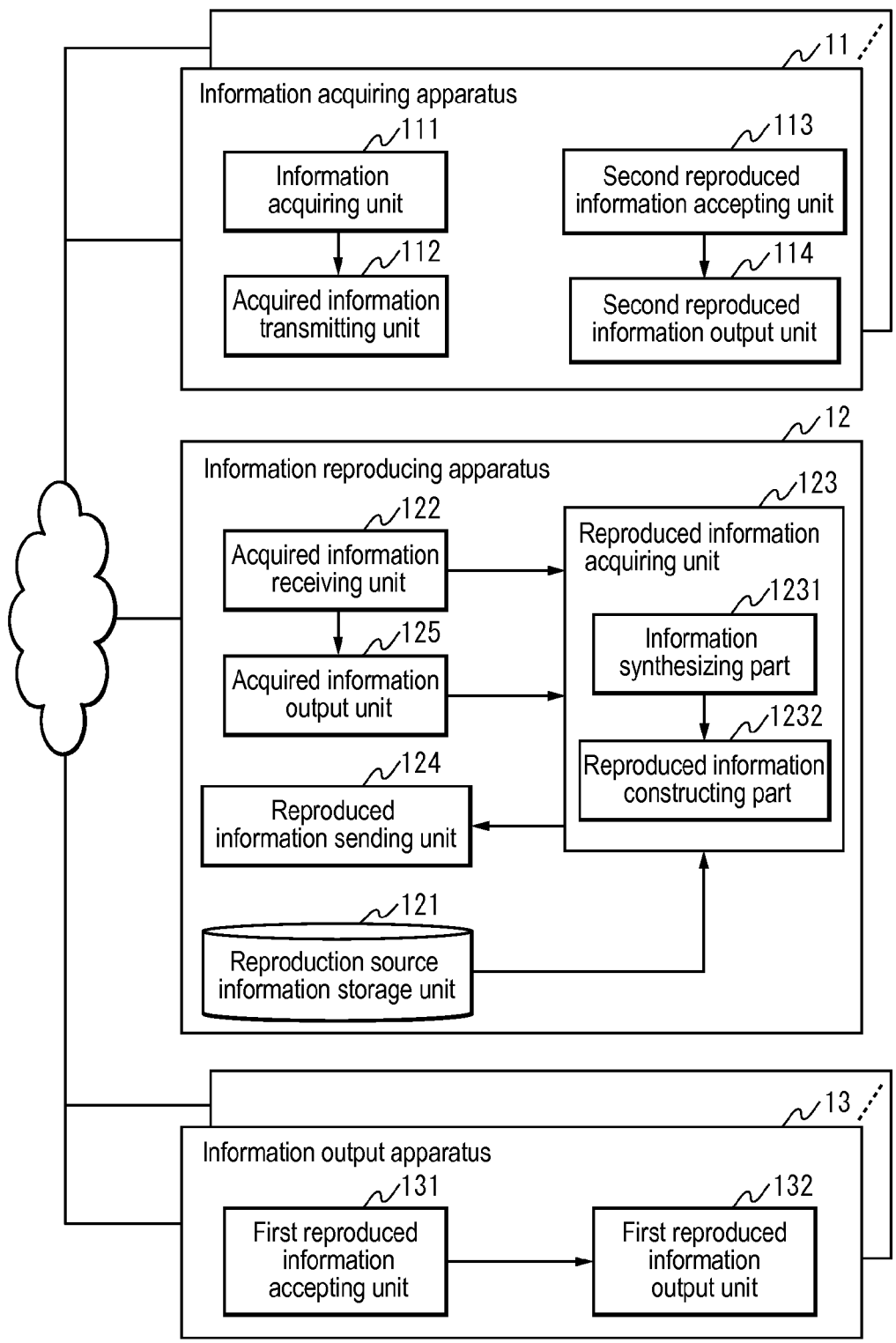
FIG. 2 is a block diagram of the information system in this embodiment.

FIG. 2 is a block diagram of the information system 1 in this embodiment.

The information acquiring apparatus 11 includes an information acquiring unit 111, an acquired information transmitting unit 112, a second reproduced information accepting unit 113, and a second reproduced information output unit 114. The information acquiring apparatus 11 may not include the second reproduced information accepting unit 113 and the second reproduced information output unit 114.

The information reproducing apparatus 12 includes a reproduction source information storage unit 121, an acquired information receiving unit 122, a reproduced information acquiring unit 123, a reproduced information sending unit 124, and an acquired information output unit 125. The information reproducing apparatus 12 may not include the reproduction source information storage unit 121.

The reproduced information acquiring unit 123 includes, for example, an information synthesizing part 1231 and a reproduced information constructing part 1232. The configuration of the reproduced information acquiring unit 123 is not limited thereto.

The information output apparatus 13 includes a first reproduced information accepting unit 131 and a first reproduced information output unit 132.

The information acquiring unit 111 forming the information acquiring apparatus 11 acquires information. Herein, examples of the information acquired by the information acquiring unit 111 include sound information, video information, trigger information, and combinations thereof. The sound information is, for example, voice, music, music performance information, sound effects, and the like. The video information may be either a still image or a moving image. The trigger information is information indicating the content of a music performance using a musical instrument, and is, for example, information containing sound identifiers and timing identifier groups. The trigger information may further contain musical instrument identifiers. The information acquiring unit 111 may be realized by a combination of one or more from among microphones, cameras, video cameras, apparatuses for acquiring music performance signals from musical instruments, and the like.

The acquired information transmitting unit 112 transmits the information acquired by the information acquiring unit 111 to the information reproducing apparatus 12. The acquired information transmitting unit 112 holds in advance transmission destination information (IP address, etc.) of the information reproducing apparatus 12 to which the information is to be transmitted. The acquired information transmitting unit 112 is realized typically by a wireless or wired communication part, but may be realized also as a broadcasting part.

The second reproduced information accepting unit 113 receives the reproduced information from the information reproducing apparatus 12. The reproduced information is information constructed by the information reproducing apparatus 12, and will be described later in detail. The second reproduced information accepting unit 113 is realized typically by a wireless or wired communication part, but may be realized also as a broadcast receiving part.

The second reproduced information output unit 114 outputs the reproduced information received by the second reproduced information accepting unit 113. Herein, the output is a concept that encompasses display on a display screen, projection using a projector, printing in a printer, output of a sound, transmission to an external apparatus, accumulation in a storage medium, and delivery of a processing result to another processing apparatus or another program. The second reproduced information output unit 114 may be considered to include or not to include an output device, such as a display screen or a loudspeaker. The second reproduced information output unit 114 may be realized, for example, by driver software for an output device, a combination of driver software for an output device and the output device, or the like.

In the reproduction source information storage unit 121 forming the information reproducing apparatus 12, reproduction source information, which is information for constructing reproduced information, can be stored. Examples of the reproduction source information include a look-up table, video information, sound information, and a combination thereof.

A look-up table contains one or at least two pieces of association information. The association information is information for associating the whole or part of one or more pieces of first information with the whole or part of one or more pieces of second information. The first information and the second information are, for example, images, sound information, or the like. If the number of pieces of association information contained in the look-up table is one, the association information is, for example, an operational expression for converting information such as an image or sound information, and one or more parameter groups that are to be given to an operational expression for converting information. The association information may be, for example, an operational expression for calculating median pixel values of spatiotemporal blocks, or the like. If the first information and the second information are images, the first information may be referred to as a first image, and the second information may be referred to as a second image.

Furthermore, if the number of pieces of association information contained in the look-up table is two or more, the association information is preferably associated with a feature amount vector, which is a group of feature amounts of information.

The second image is an image that allows, more easily than the first image, the brain to feel one or more attributes such as an appearance, a sense of distance, presence, reality, weightiness, warmth, coolness, speediness, dynamism, smooth motion, freshness, and an high-quality appearance. Note that the attribute varies from image to image. Here, the appearance refers to the appearance of an object contained in an image, such as a texture appearance, gloss, transparency, fluffiness, and a moist appearance. Furthermore, the sense of distance may refer to resolution, a sense of three dimensions, a sense of depth, a sense of air, or the like.

The second information is, for example, one or more pieces of information that can be acquired in an environment different from that of the one or more pieces of first information. That is to say, in this case, for example, the one or more pieces of first information and the one or more pieces of second information are acquired in different environments. The different environments are, for example, a city area and a suburban area (which may be referred to as countryside). In this case, the first information is music obtained by playing one tune on a street of a noisy city area, and the second information is music obtained by playing the one tune in a substantially quiet environment, for example, where chirping of birds can be heard or where 1/f fluctuation breeze blows.

Furthermore, the second information is, for example, one or more images that can be captured in another environment different from that of the one or more first images. The other environment refers to an environment different from the one environment, and refers to an environment in which an image that provides a better match with the purpose than in the one environment can be captured. The other environment refers to, for example, an environment such as (1) to (9) below: (1) an environment in which the light intensity of illumination (light source) is larger than that in the one environment; (2) an environment in which a light source is positioned such that the shadow of an object in the image is expressed more clearly than in the one environment; (3) an environment in which a light source is positioned such that the sense of three dimensions of an object in the image is expressed more clearly than in the one environment; (4) an environment in which a camera is positioned such that the sense of three dimensions of an object in the image is expressed more clearly than in the one environment; (5) an environment in which the color of illumination is different from that in the one environment; (6) an environment in which the weather is different from that in the one environment; (7) an environment in which the temperature or the humidity is different from that in the one environment; (8) an environment in which the depth of field is different from that in the one environment; and (9) an environment in which the shutter speed is different from that in the one environment. That is to say, in this case, the one environment and the other environment are different from each other in the image capturing environment, such as the amount of light, the position of the light source, the color of the light source, the position of the camera, or the settings of the camera. Furthermore, the environment typically refers to an image capturing environment, but there is no limitation to this as long as it is an environment relating to acquisition of an image.

The reproduction source information storage unit 121 is preferably a non-volatile storage medium, but may be realized also by a volatile storage medium. There is no limitation on the procedure in which the reproduction source information is stored in the reproduction source information storage unit 121. For example, the reproduction source information may be stored in the reproduction source information storage unit 121 via a storage medium, the reproduction source information transmitted via a communication line or the like may be stored in the reproduction source information storage unit 121, or the reproduction source information input via an input device may be stored in the reproduction source information storage unit 121.

The acquired information receiving unit 122 receives one or more pieces of information respectively from the one or more information acquiring apparatuses 11. The acquired information receiving unit 122 is realized typically by a wireless or wired communication part, but may be realized also as a broadcast receiving part.

The reproduced information acquiring unit 123 acquires reproduced information, using the one or more pieces of information received by the acquired information receiving unit 122 and the reproduction source information. For example, the reproduced information acquiring unit 123 acquires the whole or part of one or more pieces of second information associated with the whole or part of the one or more pieces of information received by the acquired information receiving unit 122 using association information from among the one or at least two pieces of association information, and acquires reproduced information from the acquired whole or part of one or more pieces of second information. In this case, the reproduction source information is a look-up table. The reproduced information acquiring unit 123 may be realized typically by an MPU, a memory, or the like. Typically, the processing procedure of the reproduced information acquiring unit 123 is realized by software, and the software is stored in a storage medium such as a ROM. Note that the processing procedure may be realized also by hardware (a dedicated circuit).

Furthermore, the reproduced information acquiring unit 123 may acquire reproduced information containing the two or more pieces of information output by the acquired information output unit 125 (described later). In this case, the reproduced information acquiring unit 123 may be realized, for example, by a combination of a microphone and driver software therefor.

The information synthesizing part 1231 forming the reproduced information acquiring unit 123 acquires synthesis information, by synthesizing the two or more pieces of information received by the acquired information receiving unit 122. The process that synthesizes the two or more pieces of information refers to, for example, a process such as (1) to (3) below: (1) in the case where all of the two or more pieces of information are images, a process that superimposes the two or more images one on the other, a process that changes a values of the respective two or more images, and then superimposes the two or more images one on the other, a process that recognizes and extracts specific objects (e.g., people or faces) from two or more images, and constructs an image containing the extracted objects, or the like; (2) in the case where all of the two or more pieces of information are sound information, a process that synthesizes the information in a time-synchronized manner, or the like; and (3) in the case where the two or more pieces of information are different types of information, a process that superimposes the two or more pieces of information, a process that constructs multimedia information in a time-synchronized manner, or the like.

The reproduced information constructing part 1232 constructs reproduced information, using the synthesis information acquired by the information synthesizing part 1231 and the reproduction source information.

The reproduced information sending unit 124 sends the reproduced information acquired by the reproduced information acquiring unit 123. The reproduced information sending unit 124 transmits the reproduced information acquired by the reproduced information acquiring unit 123 to the one or more information output apparatuses 13. The reproduced information sending unit 124 may transmit the reproduced information acquired by the reproduced information acquiring unit 123 to the one or more information acquiring apparatuses 11 and the one or more information output apparatuses 13. It is assumed that information for specifying an address to which the reproduced information is to be transmitted (e.g., IP address of each apparatus, etc.) is held by the reproduced information sending unit 124. The reproduced information sending unit 124 is realized typically by a wireless or wired communication part, but may be realized also as a broadcasting part. Furthermore, the reproduced information sending unit 124 may write the reproduced information acquired by the reproduced information acquiring unit 123 into one or more storage media (not shown). That is to say, the sending is a concept that encompasses transmission, accumulation in a storage medium, and delivery to another apparatus (typically, output apparatus).

The acquired information output unit 125 outputs the two or more pieces of information received by the acquired information receiving unit 122. The output herein is, for example, sound output. The acquired information output unit 125 may be realized, for example, by a loudspeaker, or the like.

The first reproduced information accepting unit 131 forming the information output apparatuses 13 receives the reproduced information from the information reproducing apparatus 12. The first reproduced information accepting unit 131 may read the reproduced information from a storage medium in which the reproduced information acquired by the information reproducing apparatus 12 is stored. The first reproduced information accepting unit 131 is realized typically by a wireless or wired communication part, but may be realized also as a broadcast receiving part. Furthermore, the receiving also encompasses the reading from a storage medium.

The first reproduced information output unit 132 outputs the reproduced information received by the first reproduced information accepting unit 131. The first reproduced information output unit 132 may be considered to include or not to include an output device, such as a display screen or a loudspeaker. The first reproduced information output unit 132 may be realized, for example, by driver software for an output device, a combination of driver software for an output device and the output device, or the like.

Next, the operation of the information system 1 will be described. First, the operation of the information acquiring apparatus 11 will be described with reference to the flowchart in FIG. 3.

(Step S301) The information acquiring unit 111 acquires information.

(Step S302) The acquired information transmitting unit 112 transmits the information acquired in step S301 to the information reproducing apparatus 12.

(Step S303) The second reproduced information accepting unit 113 judges whether or not the reproduced information from the information reproducing apparatus 12 has been received. If the reproduced information has been received, the procedure advances to step S304, and, if not, the procedure returns to step S301. Herein, if the reproduced information has not been received, the procedure may be put in WAIT state until the reproduced information is received.

(Step S304) The second reproduced information output unit 114 outputs the reproduced information received in step S303. The procedure returns to step S301.

Figure 3:
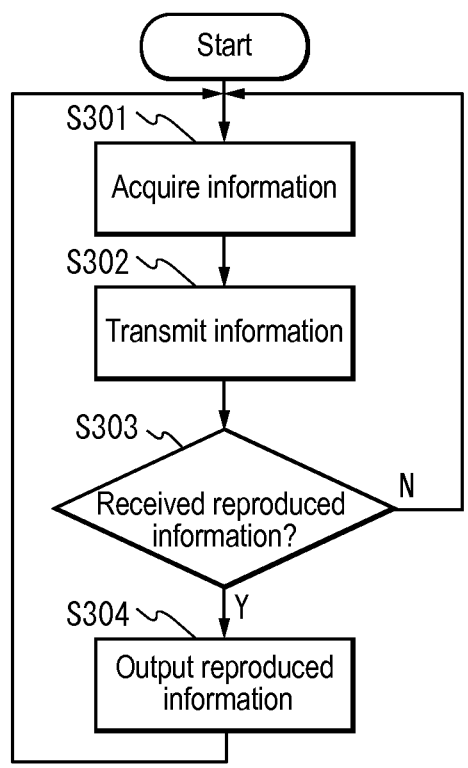
FIG. 3 is a flowchart illustrating the operation of an information acquiring apparatus in this embodiment.

Note that the process is terminated by powering off or an interruption at completion of the process in the flowchart in FIG. 3.

Next, the operation of the information reproducing apparatus 12 will be described with reference to the flowchart in FIG. 4.

(Step S401) The acquired information receiving unit 122 judges whether or not the information has been received from all information acquiring apparatuses 11. If the information has been received from all information acquiring apparatuses 11, the procedure advances to step S402, and, if not, the procedure returns to step S401.

(Step S402) The reproduced information acquiring unit 123 reads the reproduction source information from the reproduction source information storage unit 121.

(Step S403) The reproduced information acquiring unit 123 acquires reproduced information, using the reproduction source information read in step S402 and the one or more pieces of information received in step S401. The reproduced information acquiring process that acquires reproduced information will be described with reference to the flowcharts in FIGS. 5, 6, and 7.

(Step S404) The reproduced information sending unit 124 sends the reproduced information constructed in step S403 to the one or more information acquiring apparatuses 11 and the one or more information output apparatuses 13. The procedure returns to step S401.

Figure 4:
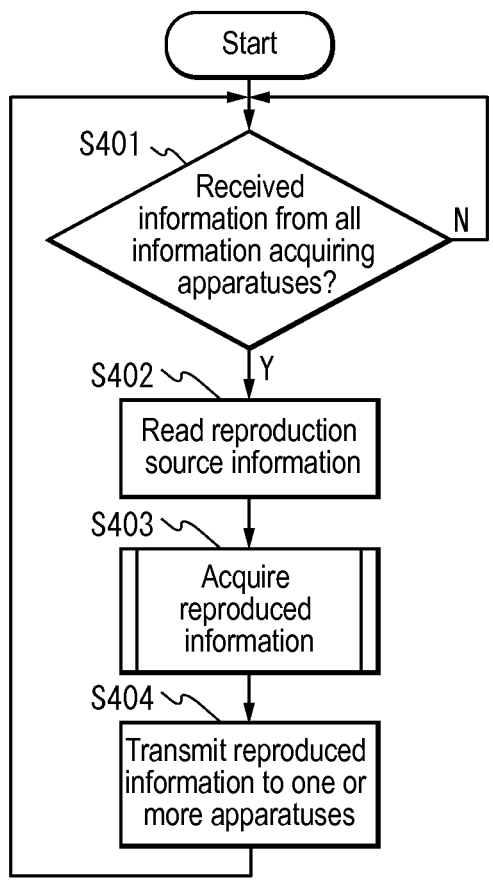
FIG. 4 is a flowchart illustrating the operation of an information reproducing apparatus in this embodiment.

Note that the process is terminated by powering off or an interruption at completion of the process in the flowchart in FIG. 4.

Figure 5:
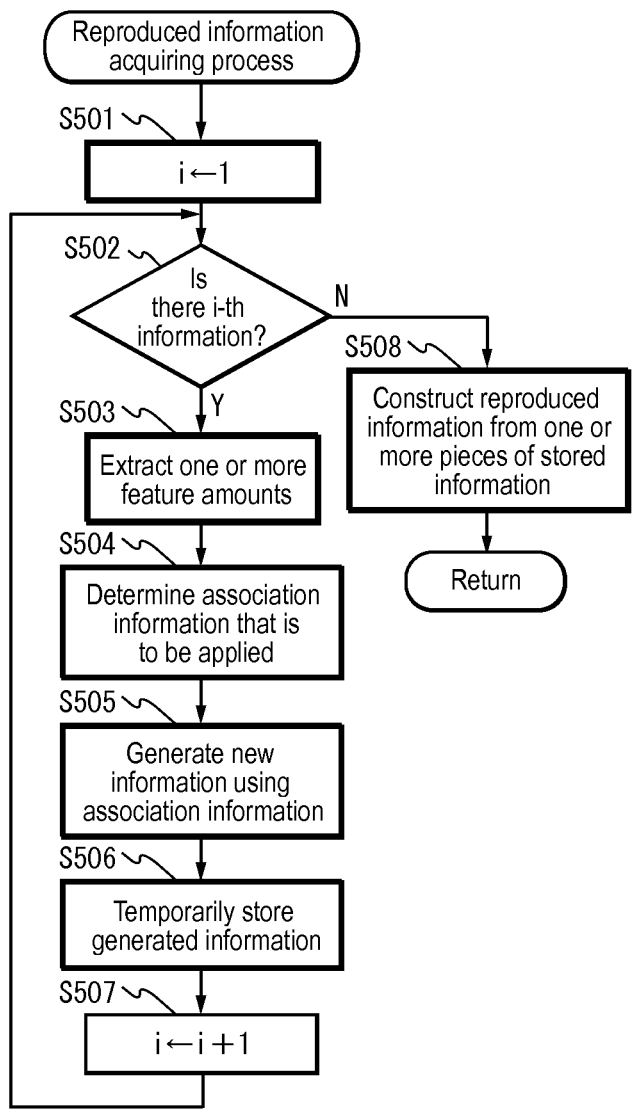
FIG. 5 is a flowchart illustrating a first example of the reproduced information acquiring process in this embodiment.

Next, a first example of the reproduced information acquiring process in step S403 will be described with reference to the flowchart in FIG. 5.

(Step S501) The reproduced information acquiring unit 123 substitutes 1 for a counter i.

(Step S502) The reproduced information acquiring unit 123 judges whether or not there is i-th information in the received information. If there is the i-th information, the procedure advances to step S503, and, if not, the procedure advances to step S508. Note that the i-th information is information transmitted from the i-th information acquiring apparatus 11.

(Step S503) The reproduced information acquiring unit 123 extracts one or more feature amounts of the i-th information. If the information is images (regardless of whether they are moving images or still images), examples of the feature include a vicinity feature amount, which is a feature amount of part of one or more images, and a whole feature amount, which is a feature amount of the whole of one or more images. Examples of the vicinity feature amount include a pixel value, an activity, a spatiotemporal correlation, a motion vector, and a frequency distribution. Furthermore, examples of the activity include a maximum value and a minimum value of multiple pixels, a dynamic range (DR), and a difference between multiple pixels. The difference between multiple pixels may be a difference between multiple pixels in a space, may be a difference between multiple pixels in the time direction, or may be a difference between multiple pixels in a space and in the time direction. Furthermore, examples of the whole feature amount include a pixel value distribution in the whole of an image, a motion vector distribution in the whole of an image, a spatiotemporal correlation of the whole of one or at least two images, a noise amount of the whole of an image, an image format, information relating to edition of the whole of an image (whether or not PinP is selected, whether or not PoutP is selected, whether or not there is text superimposed on the image, etc.), content information relating to a content, which is one or more images, and a pattern detection result (face, etc.). Herein, the content information refers to, for example, the genres, the titles, and the names of people starring in programs listed in an electronic program guide (EPG). Note that the one or more feature amounts are also referred to as feature amount vectors as appropriate.

Furthermore, if the information is sound information (music, voice, etc.), examples of the feature include a feature amount based on the mel-frequency cepstral coefficient (MFCC), and a musical sound feature amount (pitch, intensity, onset time, note value, etc.).

Note that the technique for extracting one or more feature amounts from an image or sound information is a known art, and, thus, a detailed description thereof has been omitted.

(Step S504) The reproduced information acquiring unit 123 acquires, from the look-up table, association information associated with the feature amount vector with the smallest distance from the one or more feature amounts (feature amount vector) acquired in step S503.

(Step S505) The reproduced information acquiring unit 123 generates new information, by applying the association information (e.g., operational expression) acquired in step S504 to the i-th information.

(Step S506) The reproduced information acquiring unit 123 temporarily stores the information generated in step S505 in a buffer (not shown).

(Step S507) The reproduced information acquiring unit 123 increments the counter i by 1. The procedure returns to step S502.

(Step S508) The reproduced information acquiring unit 123 constructs reproduced information from the one or more pieces of information stored in the buffer. If the number of pieces of information stored in the buffer is two or more, the reproduced information acquiring unit 123 acquires reproduced information, for example, by synthesizing the two or more pieces of information. Furthermore, if the number of pieces of information stored in the buffer is one, the reproduced information acquiring unit 123 acquires the information stored in the buffer as the reproduced information. The procedure returns to the upper-level processing.

Figure 6:
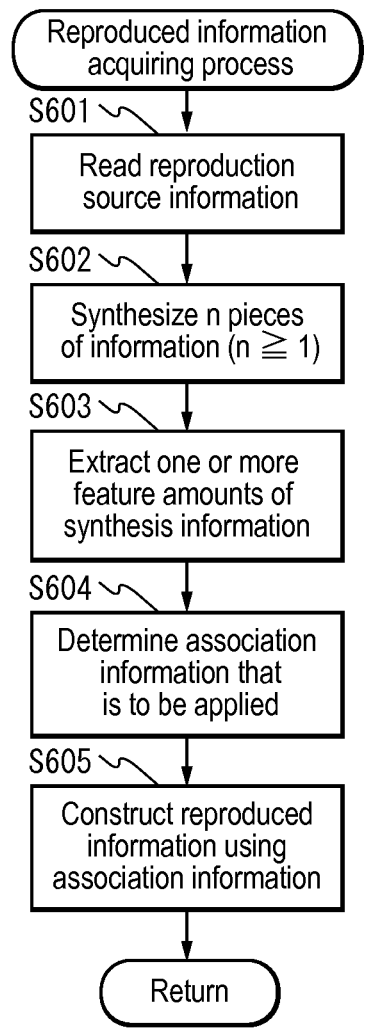
FIG. 6 is a flowchart illustrating a second example of the reproduced information acquiring process in this embodiment.

Next, a second example of the reproduced information acquiring process in step S403 will be described with reference to the flowchart in FIG. 6.

(Step S601) The reproduced information acquiring unit 123 reads reproduction source information (a look-up table) from the reproduction source information storage unit 121.

(Step S602) The reproduced information acquiring unit 123 synthesizes n pieces of information (n≥1). If n=1, the reproduced information acquiring unit 123 simply acquires that information. Furthermore, the n pieces of information are information received from the n information acquiring apparatuses 11.

(Step S603) The reproduced information acquiring unit 123 acquires one or more feature amounts of the information acquired in step S602.

(Step S604) The reproduced information acquiring unit 123 acquires, from the look-up table, association information associated with the feature amount vector with the smallest distance from the one or more feature amounts (feature amount vector) acquired in step S603.

(Step S605) The reproduced information acquiring unit 123 constructs reproduced information, by applying the association information (e.g., operational expression) acquired in step S604 to the information acquired in step S602. The procedure returns to the upper-level processing.

Next, a third example of the reproduced information acquiring process in step S403 will be described with reference to the flowchart in FIG. 7.

(Step S701) The reproduced information acquiring unit 123 reads reproduction source information (e.g., video) from the reproduction source information storage unit 121.

(Step S702) The reproduced information acquiring unit 123 synthesizes n pieces of information (n≥1). If n=1, the reproduced information acquiring unit 123 simply acquires that information.

(Step S703) The reproduced information acquiring unit 123 constructs reproduced information from the reproduction source information read in step S701 and the information acquired in step S702. The procedure returns to the upper-level processing.

Figure 7:
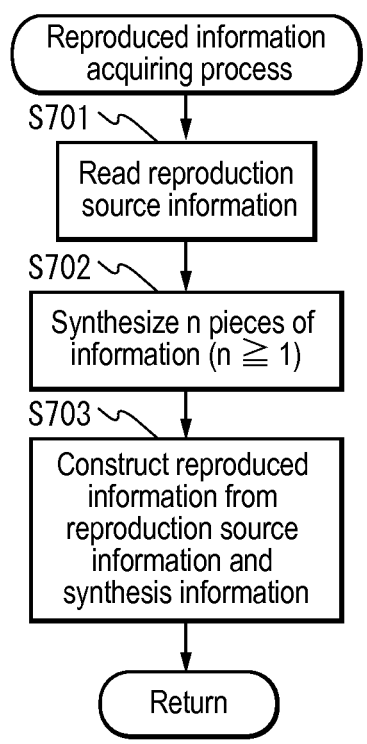
FIG. 7 is a flowchart illustrating a third example of the reproduced information acquiring process in this embodiment.

The flowchart in FIG. 7 is effective in the case where the information transmitted from the one or more information acquiring apparatuses 11 is the same type of information (e.g., sound information) and the reproduction source information is information of a type (e.g., video information) different from that of the information transmitted from the information acquiring apparatuses 11.

Furthermore, the reproduced information acquiring process is not limited to those described with reference to the flowcharts in FIGS. 5 to 7. The reproduced information acquiring process may be a process that collects the two or more pieces of information output by the acquired information output unit 125 as sound information using a microphone, or the like.

Hereinafter, examples of a specific operation of the information system 1 in this embodiment will be described. FIG. 1 is a conceptual diagram of the information system 1. Hereinafter, four specific examples will be described.

Specific Example 1

It is assumed that there are three acquisition spaces that are at remote locations. Furthermore, it is assumed that, in the first acquisition space, a music performer 1 plays the piano, and a first information acquiring apparatus 11 acquires sound information of the music obtained by playing the piano. Furthermore, it is assumed that, in the second acquisition space, a music performer 2 plays the violin, and a second information acquiring apparatus 11 acquires sound information of the music obtained by playing the violin. Furthermore, it is assumed that, in the third acquisition space, a music performer 3 plays the trumpet, and a third information acquiring apparatus 11 acquires sound information of the music obtained by playing the trumpet.

Furthermore, a look-up table for converting music information (a type of sound information) is stored in the reproduction source information storage unit 121 of the information reproducing apparatus 12. This look-up table is a group of association information for converting music information so as to make people feel as if music was being played in a particular space. That is to say, the association information forming the look-up table is, for example, an operational expression for converting the sound information such that low-pitched sounds of each musical instrument are more resonant, and a parameter group that is to be given to the operational expression. It is assumed that two or more pairs of association information and feature amount vectors are stored in the look-up table. The feature amount vector has, for example, a feature amount "sound volume" and a feature amount "frequency".

Furthermore, it is assumed that there are three output spaces in which three listeners listen to a music performance obtained by synthesizing the music performances by the three music performers.

In this situation, the information reproducing apparatus 12 transmits a trigger to start a music performance to the three information acquiring apparatuses 11, and the information acquiring apparatuses 11 receive the trigger and output a command to start a music performance to the respective acquisition spaces.

Then, the music performer 1, the music performer 2, and the music performer 3 play their respective musical instruments. Then, the information acquiring units 111 of the information acquiring apparatuses 11 in the respective acquisition spaces acquire sound information originated from the music performances. Next, the acquired information transmitting units 112 of the information acquiring apparatuses 11 in the respective acquisition spaces transmit the sound information to the information reproducing apparatus 12.

Next, the acquired information receiving unit 122 of the information reproducing apparatus 12 receives the sound information from the three information acquiring apparatuses 11.

Next, the reproduced information acquiring unit 123 divides the sound information received from the first information acquiring apparatus 11 into processing units (e.g., sound information each in 0.1 ms), and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "first new sound information"), by applying the association information acquired for each processing unit.

Furthermore, the reproduced information acquiring unit 123 divides the sound information received from the second information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "second new sound information"), by applying the association information acquired for each processing unit.

Next, the reproduced information acquiring unit 123 divides the sound information received from the third information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "third new sound information"), by applying the association information acquired for each processing unit.

Next, the reproduced information acquiring unit 123 synthesizes the first new sound information, the second new sound information, and the third new sound information, in a time-synchronized manner. The sound information acquired by this synthesizing is the reproduced information. The method for synchronizing timings is a known method, such as those for synchronizing timings to start music performances, and, thus, a detailed description thereof has been omitted.

Next, the reproduced information sending unit 124 of the information reproducing apparatus 12 sends the acquired reproduced information to the three information acquiring apparatuses 11 and the three information output apparatuses 13.

Then, the second reproduced information accepting units 113 of the three information acquiring apparatuses 11 receive the reproduced information. Next, the second reproduced information output units 114 output the received reproduced information. With this processing, the three music performers at remote locations can give music performances, while listening to the music that is listened to by the listeners.

Furthermore, the first reproduced information accepting units 131 of the three information output apparatuses 13 receive the reproduced information. Next, the first reproduced information output units 132 output the received reproduced information. With this processing, the listeners can listen to music information obtained by adding a value to synthesis music information, instead of listening to music information obtained by simple synthesizing.

Then, the above-described processing is repeated, until the music performance is ended, or until an instruction to abort the process is input from the information acquiring apparatuses 11, the information reproducing apparatus 12, or the like.

Specific Example 2

Specific Example 2 is different from Specific Example 1 in that video captured in the reproduction space is stored in addition to the look-up table in the reproduction source information storage unit 121 of the information reproducing apparatus 12. Furthermore, the reproduced information contains not only the music information obtained by adding a value to the synthesis music information but also video. The numbers of acquisition spaces and output spaces are the same as those in Specific Example 1.

In this situation, the information reproducing apparatus 12 transmits a trigger to start a music performance to the three information acquiring apparatuses 11, and the information acquiring apparatuses 11 receive the trigger and output a command to start a music performance to the respective acquisition spaces.

Then, the music performer 1, the music performer 2, and the music performer 3 play their respective musical instruments. Then, the information acquiring units 111 of the information acquiring apparatuses 11 in the respective acquisition spaces acquire sound information originated from the music performances. Next, the acquired information transmitting units 112 of the information acquiring apparatuses 11 in the respective acquisition spaces transmit the sound information to the information reproducing apparatus 12.

Next, the acquired information receiving unit 122 of the information reproducing apparatus 12 receives the sound information from the three information acquiring apparatuses 11.

Next, the reproduced information acquiring unit 123 divides the sound information received from the first information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "first new sound information"), by applying the association information acquired for each processing unit.

Furthermore, the reproduced information acquiring unit 123 divides the sound information received from the second information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "second new sound information"), by applying the association information acquired for each processing unit.

Next, the reproduced information acquiring unit 123 divides the sound information received from the third information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "third new sound information"), by applying the association information acquired for each processing unit.

Next, the reproduced information acquiring unit 123 synthesizes the first new sound information, the second new sound information, and the third new sound information, in a time-synchronized manner. The sound information acquired by this synthesizing is used to construct the reproduced information.

Next, the reproduced information acquiring unit 123 acquires part of the video stored in the reproduction source information storage unit 121. The part of video is video having an output duration similar to that of the sound information acquired by the synthesizing, and is next video of recently acquired video.

Then, the reproduced information acquiring unit 123 constructs reproduced information containing the sound information acquired by the synthesizing and the acquired video.

Next, the reproduced information sending unit 124 of the information reproducing apparatus 12 sends the acquired reproduced information to the three information acquiring apparatuses 11 and the three information output apparatuses 13.

Then, the second reproduced information accepting units 113 of the three information acquiring apparatuses 11 receive the reproduced information. Next, the second reproduced information output units 114 output, from loudspeakers, the sound information forming the received reproduced information. Furthermore, the second reproduced information output units 114 output, on display screens, the video forming the received reproduced information. With this processing, the three music performers at remote locations can give music performances, while listening to the music that is listened to by the listeners and while feeling an atmosphere in the reproduction space.

Furthermore, the first reproduced information accepting units 131 of the three information output apparatuses 13 receive the reproduced information. Next, the first reproduced information output units 132 output, from loudspeakers, the sound information forming the received reproduced information. Furthermore, the first reproduced information output units 132 output, on display screens, the video forming the received reproduced information. With this processing, the viewers can listen to music information obtained by adding a value to synthesis music information, instead of listening to music information obtained by simple synthesizing. Furthermore, the viewers can listen to a music performance while feeling an atmosphere in the reproduction space.

Then, the above-described processing is repeated, until the music performance is ended, or until an instruction to abort the process is input from the information acquiring apparatuses 11, the information reproducing apparatus 12, or the like.

Specific Example 3

In Specific Example 3, the information acquired by the information acquiring units 111 of the information acquiring apparatuses 11 in the respective acquisition spaces is trigger information. Herein, the trigger information contains loudness of sounds of musical instruments, information for identifying sounds, timing information indicating when sounds were output. Furthermore, the trigger information may contain identifiers for musical instruments.

Furthermore, the video captured in the reproduction space is stored in the reproduction source information storage unit 121 of the information reproducing apparatus 12.

In Specific Example 3, the numbers of acquisition spaces and output spaces are the same as those in Specific Example 1.

In this situation, the information reproducing apparatus 12 transmits a trigger to start a music performance to the three information acquiring apparatuses 11, and the information acquiring apparatuses 11 receive the trigger and output a command to start a music performance to the respective acquisition spaces.

Then, the music performer 1, the music performer 2, and the music performer 3 play their respective musical instruments. Then, the information acquiring units 111 of the information acquiring apparatuses 11 in the respective acquisition spaces acquire sound information originated from the music performances, and covert the sound information to trigger information. The information acquiring units 111 may be capable of communicating with the musical instruments, and directly acquire the trigger information from the musical instruments. Next, the acquired information transmitting units 112 of the information acquiring apparatuses 11 in the respective acquisition spaces transmit the trigger information to the information reproducing apparatus 12.

Next, the acquired information receiving unit 122 of the information reproducing apparatus 12 receive the trigger information from the three information acquiring apparatuses 11.

Next, the reproduced information acquiring unit 123 acquires first sound information, second sound information, and third sound information, by converting the trigger information received from the three information acquiring apparatuses 11 to the sound information.

Next, the reproduced information acquiring unit 123 synthesizes the first sound information, the second sound information, and the third sound information, in a time-synchronized manner. The sound information acquired by this synthesizing is used to construct the reproduced information.

Next, the reproduced information acquiring unit 123 acquires part of the video stored in the reproduction source information storage unit 121. The part of video is video having an output duration similar to that of the sound information acquired by the synthesizing, and is next video of recently acquired video.

Then, the reproduced information acquiring unit 123 constructs reproduced information containing the sound information acquired by the synthesizing and the acquired video.

Next, the reproduced information sending unit 124 of the information reproducing apparatus 12 sends the acquired reproduced information to the three information acquiring apparatuses 11 and the three information output apparatuses 13.

Then, the second reproduced information accepting units 113 of the three information acquiring apparatuses 11 receive the reproduced information. Next, the second reproduced information output units 114 output, from loudspeakers, the sound information forming the received reproduced information. Furthermore, the second reproduced information output units 114 output, on display screens, the video forming the received reproduced information. With this processing, the three music performers at remote locations can give music performances, while listening to the music that is listened to by the listeners and while feeling an atmosphere in the reproduction space.

Furthermore, the first reproduced information accepting units 131 of the three information output apparatuses 13 receive the reproduced information. Next, the first reproduced information output units 132 output, from loudspeakers, the sound information forming the received reproduced information. Furthermore, the first reproduced information output units 132 output, on display screens, the video forming the received reproduced information. With this processing, the viewers can listen to music information obtained by adding a value to synthesis music information, instead of listening to music information obtained by simple synthesizing. Furthermore, the viewers can listen to a music performance while feeling an atmosphere in the reproduction space.

Then, the above-described processing is repeated, until the music performance is ended, or until an instruction to abort the process is input from the information acquiring apparatuses 11, the information reproducing apparatus 12, or the like.

Specific Example 4

Specific Example 4 is different from Specific Example 3 in that a look-up table is stored in addition to the video captured in the reproduction space in the reproduction source information storage unit 121 of the information reproducing apparatus 12. In this look-up table, two or more pieces of association information for associating trigger information with sound information that is to be acquired are stored. The association information may be a pair of trigger information and sound information that is to be acquired, or may be a pair of trigger information and an operational expression for generating sound information. Furthermore, in the look-up table, two or more pieces of association information and trigger information associated with each piece of association information may be stored. It is assumed that the association information is information for improving the quality of the sound information. Furthermore, the numbers of acquisition spaces and output spaces are the same as those in Specific Example 1.

In this situation, the information reproducing apparatus 12 transmits a trigger to start a music performance to the three information acquiring apparatuses 11, and the information acquiring apparatuses 11 receive the trigger and output a command to start a music performance to the respective acquisition spaces.

Then, the music performer 1, the music performer 2, and the music performer 3 play their respective musical instruments. Then, the information acquiring units 111 of the information acquiring apparatuses 11 in the respective acquisition spaces acquire sound information originated from the music performances, and covert the sound information to trigger information. The information acquiring units 111 may be capable of communicating with the musical instruments, and directly acquire the trigger information from the musical instruments. Next, the acquired information transmitting units 112 of the information acquiring apparatuses 11 in the respective acquisition spaces transmit the trigger information to the information reproducing apparatus 12.

Next, the acquired information receiving unit 122 of the information reproducing apparatus 12 receive the trigger information from the three information acquiring apparatuses 11.

Next, the reproduced information acquiring unit 123 searches the look-up table using, as a key, the trigger information received from each of the three information acquiring apparatuses 11, and acquires association information associated with the trigger information. Then, the reproduced information acquiring unit 123 uses the association information to acquire sound information associated with the trigger information from each of the information acquiring apparatuses 11. Then, it is assumed that the reproduced information acquiring unit 123 acquires first sound information, second sound information, and third sound information.

Next, the reproduced information acquiring unit 123 synthesizes the first sound information, the second sound information, and the third sound information, in a time-synchronized manner. The sound information acquired by this synthesizing is the reproduced information.

Next, the reproduced information sending unit 124 of the information reproducing apparatus 12 sends the acquired reproduced information to the three information acquiring apparatuses 11 and the three information output apparatuses 13.

Then, the second reproduced information accepting units 113 of the three information acquiring apparatuses 11 receive the reproduced information. Next, the second reproduced information output units 114 output, from loudspeakers, the sound information forming the received reproduced information. With this processing, the three music performers at remote locations can give music performances, while listening to the music that is listened to by the listeners.

Furthermore, the first reproduced information accepting units 131 of the three information output apparatuses 13 receive the reproduced information. Next, the first reproduced information output units 132 output, from loudspeakers, the sound information forming the received reproduced information. With this processing, the viewers can listen to music information obtained by adding a value to synthesis music information, instead of listening to music information obtained by simple synthesizing.

Then, the above-described processing is repeated, until the music performance is ended, or until an instruction to abort the process is input from the information acquiring apparatuses 11, the information reproducing apparatus 12, or the like.

As described above, according to this embodiment, it is possible to output information obtained by adding a value to information received from one or more remote locations.

Furthermore, according to this embodiment, it is possible to output, to an acquisition space, information similar to reproduced information that is to be output to an output space. As a result, people who are generating information (e.g., music performers) can generate information (e.g., give music performances), while viewing information that is to be finally output to the viewers.

Furthermore, the processing in this embodiment may be realized using software. The software may be distributed by software download or the like. Furthermore, the software may be distributed in a form where the software is stored in a storage medium such as a CD-ROM. Note that the same is applied to other embodiments described in this specification. The software that realizes the information reproducing apparatus 12 in this embodiment may be the following sort of program. Specifically, this program is a program using a storage medium in which reproduction source information, which is information for constructing reproduced information, is stored, the program causing a computer to function as: an acquired information receiving unit that receives at least one piece of information respectively from the at least one information acquiring apparatus; a reproduced information acquiring unit that acquires reproduced information, using the at least one piece of information received by the acquired information receiving unit and the reproduction source information; and a reproduced information sending unit that sends the reproduced information acquired by the reproduced information acquiring unit to the at least one information output apparatus.

Furthermore, in this program, it is preferable that the computer is caused to function such that the reproduced information sending unit sends the reproduced information acquired by the reproduced information acquiring unit to the at least one information acquiring apparatus and the at least one information output apparatus.

Furthermore, in this program, it is preferable that the computer is caused to function such that the reproduced information acquiring unit includes: an information synthesizing part that acquires synthesis information, by synthesizing at least two pieces of information received by the acquired information receiving unit; and a reproduced information constructing part that constructs reproduced information, using the synthesis information acquired by the information synthesizing part and the reproduction source information.

Furthermore, in this program, it is preferable that the computer is caused to function such that the reproduced information acquiring unit converts each of at least one piece of trigger information received by the acquired information receiving unit to outputtable information, and constructs reproduced information, using the at least one piece of converted information and the reproduction source information.

Furthermore, in this program, it is preferable that the computer is caused to function such that the reproduction source information is a look-up table containing one or at least two pieces of association information for associating the whole or part of at least one piece of received first information with the whole or part of second information, which is information on the same object as the first information, and the reproduced information acquiring unit acquires the whole or part of at least one piece of second information associated with the whole or part of the at least one piece of information received by the acquired information receiving unit, using association information from among the one or at least two pieces of association information, and acquires reproduced information from the acquired whole or part of at least one piece of second information.

Embodiment 2

In this embodiment, an information system will be described in which there are two or more information acquiring apparatuses, and two or more pieces of information respectively acquired by the information acquiring apparatuses are aggregated by one information aggregating apparatus to form one piece of reproduced information which will be presented to acquisition spaces and viewing spaces.

Figure 8:
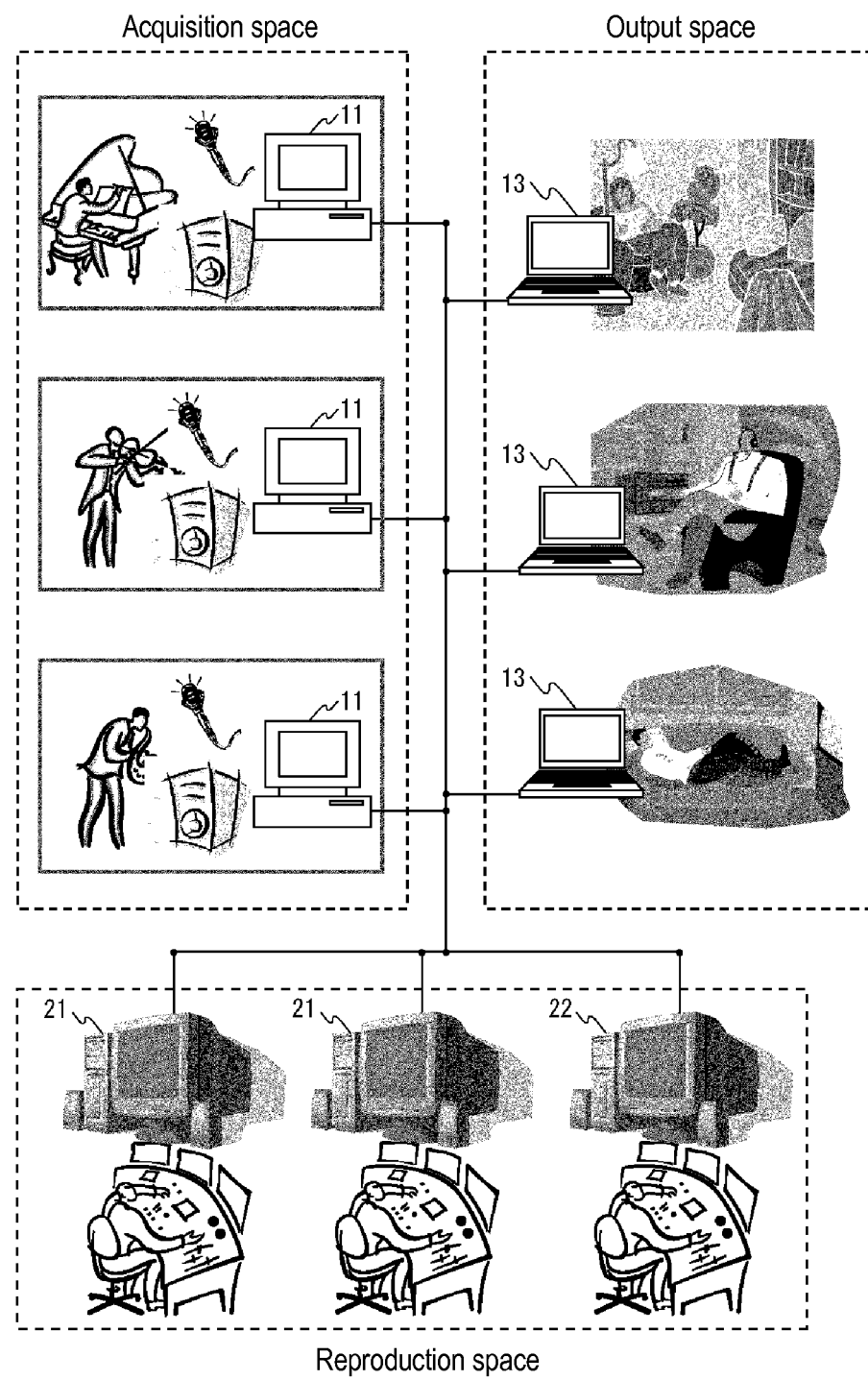
FIG. 8 is a conceptual diagram of an information system in Embodiment 2.

FIG. 8 is a conceptual diagram of an information system 2 in this embodiment. The information system 2 includes two or more information acquiring apparatuses 11, one or more information reproducing apparatuses 21, one information aggregating apparatus 22, and one or more information output apparatuses 13. The information aggregating apparatus 22 is an apparatus that receives the information constructed by the one or more information reproducing apparatuses 21, and constructs reproduced information that is to be output.

Figure 9:
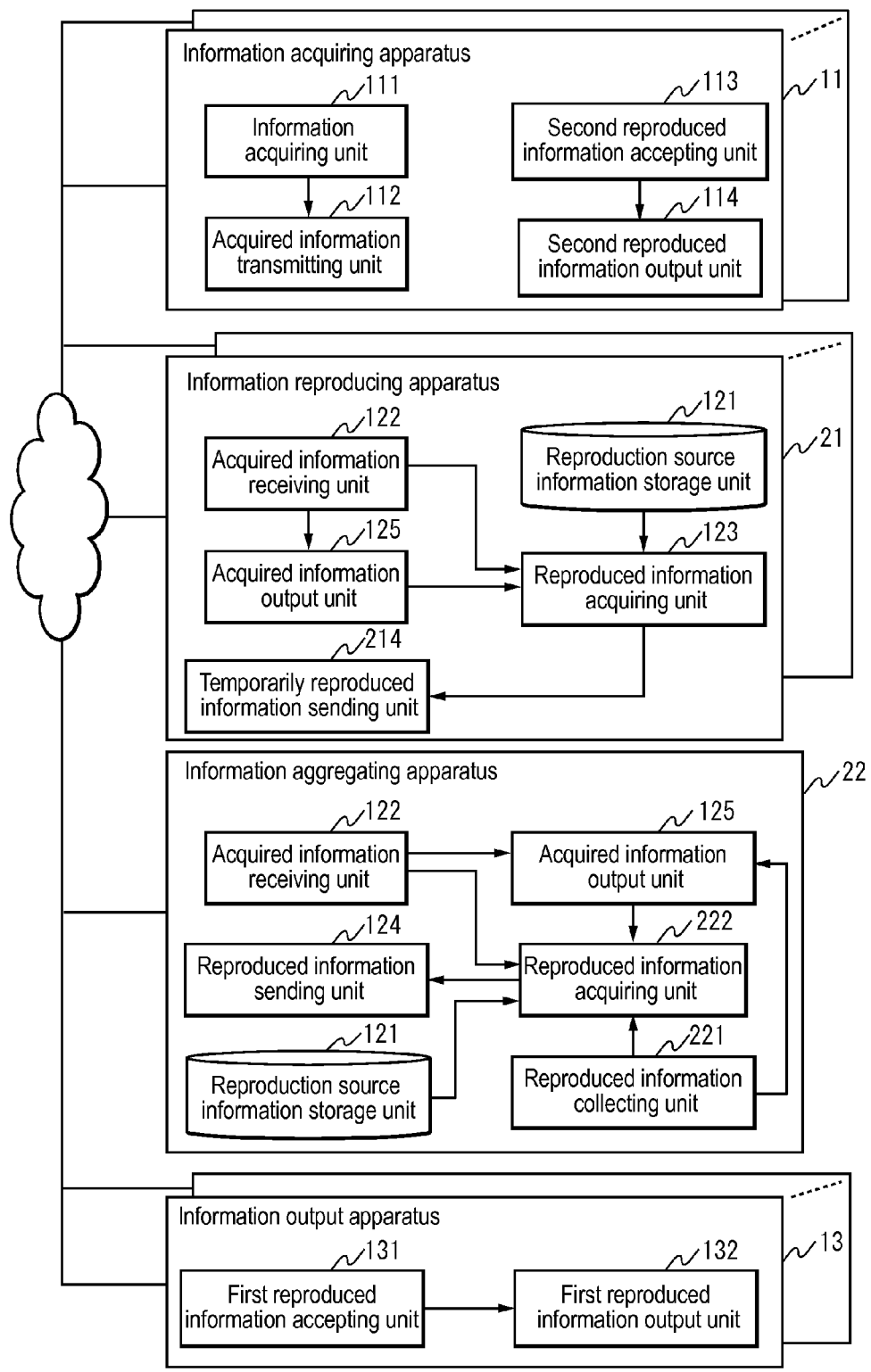
FIG. 9 is a block diagram of the information system in this embodiment.

FIG. 9 is a block diagram of the information system 2 in this embodiment.

The information reproducing apparatus 21 includes the reproduction source information storage unit 121, the acquired information receiving unit 122, the reproduced information acquiring unit 123, a temporarily reproduced information sending unit 214, and the acquired information output unit 125.

The information aggregating apparatus 22 includes the reproduction source information storage unit 121, the acquired information receiving unit 122, a reproduced information collecting unit 221, a reproduced information acquiring unit 222, the reproduced information sending unit 124, and the acquired information output unit 125. The information aggregating apparatus 22 may not include the reproduction source information storage unit 121. Furthermore, the acquired information output unit 125 herein outputs the information received by the acquired information receiving unit 122 and the reproduced information received by the reproduced information collecting unit 221.

The temporarily reproduced information sending unit 214 forming the information reproducing apparatus 21 transmits the reproduced information acquired by the reproduced information acquiring unit 123 to the information aggregating apparatus 22. The temporarily reproduced information sending unit 214 is realized typically by a wireless or wired communication part, but may be realized also as a broadcasting part.

The reproduced information collecting unit 221 forming the information aggregating apparatus 22 receives the one or more pieces of reproduced information from the one or more information reproducing apparatuses 21. The reproduced information collecting unit 221 is realized typically by a wireless or wired communication part, but may be realized also as a broadcast receiving part.

The reproduced information acquiring unit 222 constructs reproduced information that is to be output, using the one or more pieces of information received by the acquired information receiving unit 122, one or more types of reproduction source information in the reproduction source information storage unit 121, and the one or more pieces of reproduced information received by the reproduced information collecting unit 221. The reproduced information acquiring unit 222 may acquire reproduced information containing the two or more pieces of information output by the acquired information output unit 125, and construct reproduced information that is to be output, using the acquired reproduced information and the one or more pieces of reproduced information received by the reproduced information collecting unit 221.

The reproduced information acquiring unit 222 constructs reproduced information that is to be output, for example, by synthesizing the one or more pieces of information received by the acquired information receiving unit 122 and the one or more pieces of reproduced information received by the reproduced information collecting unit 221. The one or more pieces of information received by the acquired information receiving unit 122 and the one or more pieces of reproduced information received by the reproduced information collecting unit 221 may be the same type of information (e.g., music information), or may be different types of information (e.g., video and music information). The method for constructing the same type of information is a known art. Furthermore, the synthesizing different types of information (e.g., video and music information) is a known art, such as superimposing, constructing synchronized multimedia data, or the like.

Furthermore, the reproduced information acquiring unit 222 may construct reproduced information, for example, using the one or more pieces of information received by the acquired information receiving unit 122 and the reproduction source information in the reproduction source information storage unit 121, and synthesis the constructed reproduced information and one or more pieces of received reproduced information. The process that constructs reproduced information using the one or more pieces of information received by the acquired information receiving unit 122 and the reproduction source information has been described above. Herein, two or more pieces of reproduced information may be (1) the same one type of information, (2) the same two or more types of information, (3) different types of information, each piece of reproduced information being one type of information, and (4) different types of information, there being reproduced information containing two or more types of information. In the case of (1), the reproduced information acquiring unit 222 synthesizes the two or more pieces of reproduced information of the same type. In the case of (2), the reproduced information acquiring unit 222 constructs reproduced information that is to be output, for example, by synthesizing each type of information contained in the two or more pieces of reproduced information, for each type of information, and superimposing the acquired two or more types of information or constructing synchronized multimedia data. In the case of (3), the reproduced information acquiring unit 222 constructs reproduced information that is to be output, for example, by superimposing the two or more types of reproduced information, constructing synchronized multimedia data from the two or more types of reproduced information, or the like. Furthermore, in the case of (4), the reproduced information acquiring unit 222 acquires the same type of information from each piece of reproduced information, for each type of information, synthesizes the acquired information, and constructs reproduced information that is to be output, for example, by superimposing the two or more types of information acquired by the synthesizing, constructing synchronized multimedia data, or the like.

The reproduced information acquiring unit 222 may be realized typically by an MPU, a memory, or the like. Typically, the processing procedure of the reproduced information acquiring unit 222 is realized by software, and the software is stored in a storage medium such as a ROM. Note that the processing procedure may be realized also by hardware (a dedicated circuit).

Next, the operation of the information system 2 will be described. First, the operation of the information reproducing apparatus 21 will be described. The information reproducing apparatus 21 is different from the information reproducing apparatus 12 in the destination to which the reproduced information is transmitted. Accordingly, the operation of the information reproducing apparatus 21 is substantially similar to that in FIG. 4, and is different therefrom in that, in step S404, the temporarily reproduced information sending unit 214 transmits the reproduced information to the information aggregating apparatus 22.

Next, the operation of the information aggregating apparatus 22 will be described with reference to the flowchart in FIG. 10. In the flowchart in FIG. 10, a description of the same processing as in the flowchart in FIG. 4 has been omitted.

(Step S1001) The acquired information receiving unit 122 judges whether or not the information has been received from the one or more information acquiring apparatuses 11. If the information has been received, the procedure advances to step S1002, and, if not, the procedure returns to step S1001. The one or more information acquiring apparatuses 11 from which information is transmitted to the acquired information receiving unit 122 are determined in advance as being apparatuses that transmit the information to the information aggregating apparatus 22. Furthermore, the one or more information acquiring apparatuses 11 from which information is transmitted to the information reproducing apparatuses 21 are also determined in advance.

(Step S1002) The reproduced information collecting unit 221 judges whether or not the reproduced information from all of the one or more information reproducing apparatuses 21 has been received. If the reproduced information has been received, the procedure advances to step S1402, and, if not, the procedure returns to step S1002.

(Step S1003) The reproduced information acquiring unit 222 synthesizes two or more pieces of reproduced information. The process that synthesizes two or more pieces of reproduced information will be described with reference to the flowchart in FIG. 11. The two or more pieces of reproduced information are the reproduced information constructed in step S403 and the one or more pieces of reproduced information received in step S1002.

(Step S1004) The reproduced information acquiring unit 222 transmits the reproduced information constructed in step S1003 to the two or more information acquiring apparatuses 11 and the one or more information output apparatuses 13. The procedure returns to step S1001.

Figure 10:
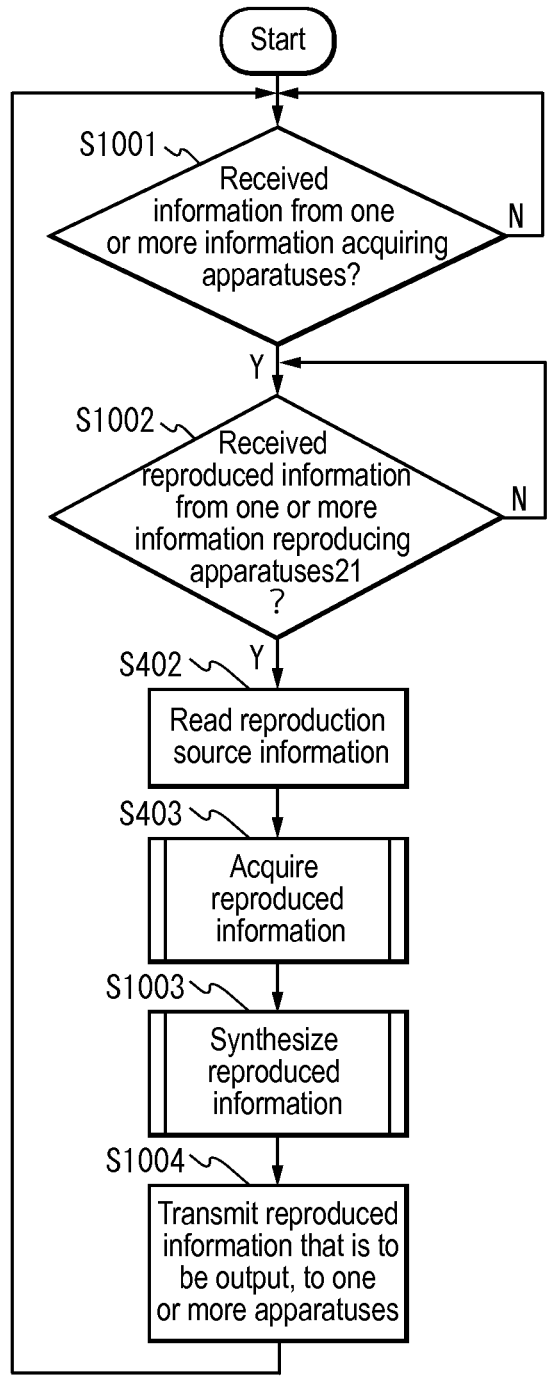
FIG. 10 is a flowchart illustrating the operation of an information reproducing apparatus in this embodiment.

Note that the process is terminated by powering off or an interruption at completion of the process in the flowchart in FIG. 10.

Figure 11:
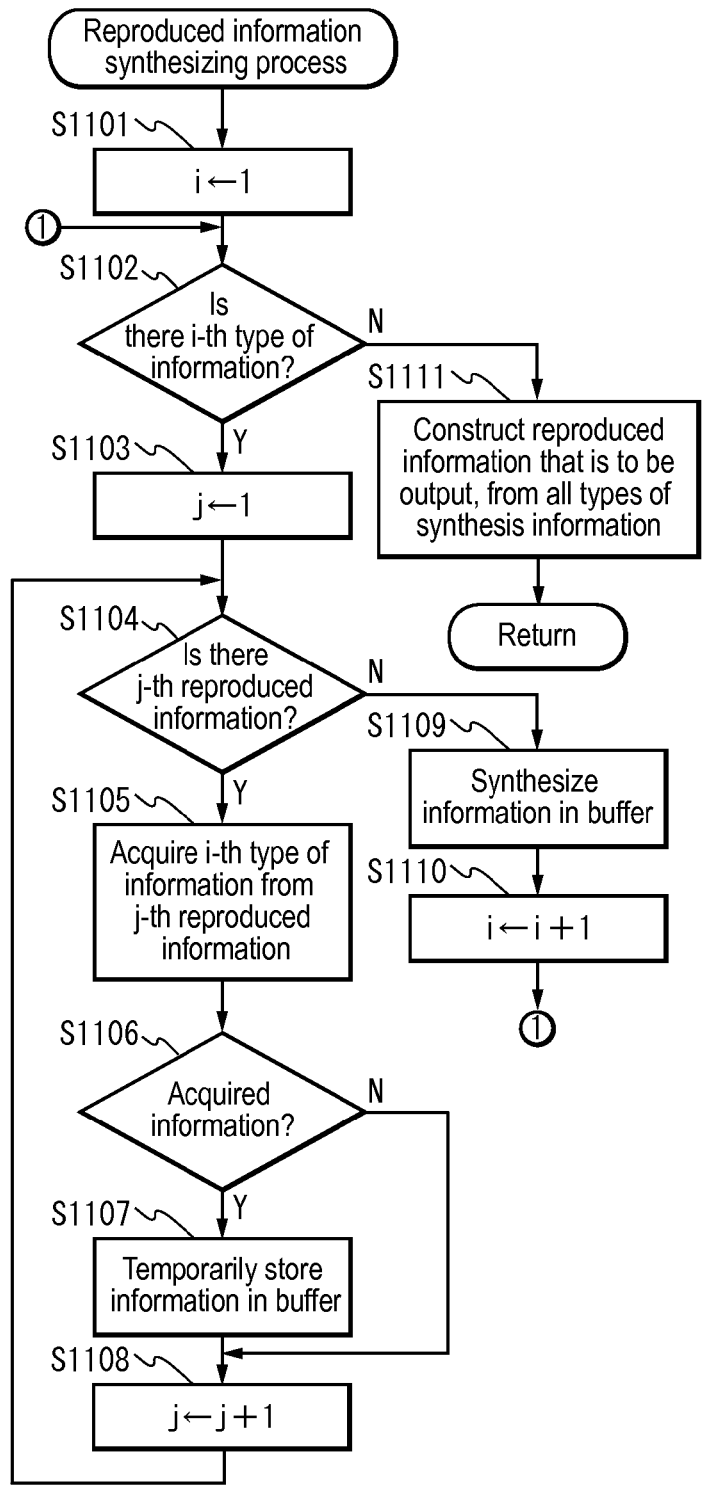
FIG. 11 is a flowchart illustrating the reproduced information synthesizing process in this embodiment.

Next, the reproduced information synthesizing process in step S1003 will be described with reference to the flowchart in FIG. 11.

(Step S1101) The reproduced information acquiring unit 222 substitutes 1 for a counter i.

(Step S1102) The reproduced information acquiring unit 222 judges whether or not there is an i-th type of information in the two or more pieces of reproduced information. If there is the i-th type of information, the procedure advances to step S1103, and, if not, the procedure advances to step S1111.

(Step S1103) The reproduced information acquiring unit 222 substitutes 1 for a counter j.

(Step S1104) The reproduced information acquiring unit 222 judges whether or not there is j-th reproduced information. If there is the j-th reproduced information, the procedure advances to step S1105, and, if not, the procedure advances to step S1109.

(Step S1105) The reproduced information acquiring unit 222 acquires the i-th type of information from the j-th reproduced information.

(Step S1106) The reproduced information acquiring unit 222 judges whether or not the i-th type of information has been acquired. If the i-th type of information has been acquired, the procedure advances to step S1107, and, if not, the procedure advances to step S1108.

(Step S1107) The reproduced information acquiring unit 222 temporarily stores the acquired i-th type of information in a buffer (not shown).

(Step S1108) The reproduced information acquiring unit 222 increments the counter j by 1. The procedure returns to step S1104.

(Step S1109) The reproduced information acquiring unit 222 synthesizes all i-th type of information in the buffer (not shown). The synthesizing method preferably varies depending on the type or content of information. Furthermore, the information acquired by synthesizing in this step is referred to as synthesis information.

(Step S1110) The reproduced information acquiring unit 222 increments the counter i by 1. The procedure returns to step S1102.

(Step S1111) The reproduced information acquiring unit 222 constructs reproduced information that is to be output, from all types of synthesis information. The procedure returns to the upper-level processing.

Hereinafter, a specific operation of the information system 2 in this embodiment will be described. FIG. 8 is a conceptual diagram of the information system 2.

It is assumed that there are three acquisition spaces that are at remote locations. Furthermore, it is assumed that, in the first acquisition space, the music performer 1 plays the piano, and the first information acquiring apparatus 11 acquires sound information of the music obtained by playing the piano. Furthermore, it is assumed that, in the second acquisition space, the music performer 2 plays the violin, and the second information acquiring apparatus 11 acquires sound information of the music obtained by playing the violin. Furthermore, it is assumed that, in the third acquisition space, the music performer 3 plays the trumpet, and the third information acquiring apparatus 11 acquires sound information of the music obtained by playing the trumpet.

Furthermore, the first information acquiring apparatus 11 and the second information acquiring apparatus 11 transmit information to the information reproducing apparatus 21. Furthermore, a look-up table for converting music information of the piano and the violin (a type of sound information) is stored in the reproduction source information storage units 121 of the information reproducing apparatus 21.

Furthermore, it is assumed that the third information acquiring apparatus 11 transmits information to the information aggregating apparatus 22. Furthermore, it is assumed that a look-up table for converting music information of the trumpet (a type of sound information) and video captured in the reproduction space are stored in the reproduction source information storage unit 121 of the information aggregating apparatus 22.

Furthermore, it is assumed that there are three output spaces in which three listeners listen to a music performance obtained by synthesizing the music performances by the three music performers.

In this situation, for example, the information aggregating apparatus 22 transmits a trigger to start a music performance to the three information acquiring apparatuses 11, and the information acquiring apparatuses 11 receive the trigger and output a command to start a music performance to the respective acquisition spaces.

Then, the music performer 1, the music performer 2, and the music performer 3 play their respective musical instruments. Then, the information acquiring units 111 of the information acquiring apparatuses 11 in the respective acquisition spaces acquire sound information originated from the music performances. Next, the acquired information transmitting units 112 of the information acquiring apparatuses 11 in the first and the second acquisition spaces transmit the sound information to the information reproducing apparatus 21. Furthermore, the acquired information transmitting unit 112 of the information acquiring apparatus 11 in the third acquisition space transmits the sound information to the information aggregating apparatus 22.

Next, the acquired information receiving unit 122 of the information reproducing apparatus 21 receives the sound information from the first and the second information acquiring apparatuses 11. Furthermore, the acquired information receiving unit 122 of the information aggregating apparatus 22 receives the sound information from the third information acquiring apparatus 11.

Next, the reproduced information acquiring unit 123 of the information reproducing apparatus 21 divides the sound information received from the first information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "first new sound information"), by applying the association information acquired for each processing unit.

Furthermore, the reproduced information acquiring unit 123 of the information reproducing apparatus 21 divides the sound information received from the second information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "second new sound information"), by applying the acquired association information.

Next, the reproduced information acquiring unit 123 of the information reproducing apparatus 21 synthesizes the first new sound information and the second new sound information in a time-synchronized manner. The sound information acquired by this synthesizing is the reproduced information that is to be transmitted to the information aggregating apparatus 22.

Next, the temporarily reproduced information sending unit 214 of the information reproducing apparatus 21 transmits the acquired reproduced information to the information aggregating apparatus 22.

Next, the reproduced information collecting unit 221 of the information aggregating apparatus 22 receives the reproduced information from the information reproducing apparatus 21.

Next, the reproduced information acquiring unit 222 of the information aggregating apparatus 22 divides the sound information received from the third information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "third new sound information"), by applying the association information acquired for each processing unit.

Next, the reproduced information acquiring unit 222 of the information aggregating apparatus 22 acquires synthesis sound information, by synthesizing the reproduced information received from the information reproducing apparatus 21 (information obtained by synthesizing the sound information of the piano and the violin) and the third new sound information in a time-synchronized manner. The method for synthesizing the sound information is a known art.

Next, the reproduced information acquiring unit 222 of the information aggregating apparatus 22 acquires part of the video stored in the reproduction source information storage unit 121. The part of video is video having an output duration similar to that of the synthesis sound information, and is next video of recently acquired video.

Then, the reproduced information acquiring unit 222 of the information aggregating apparatus 22 constructs reproduced information containing the synthesis sound information and the acquired video.

Next, the reproduced information sending unit 124 of the information aggregating apparatus 22 transmits the acquired reproduced information to the three information acquiring apparatuses 11 and the three information output apparatuses 13.

Then, the second reproduced information accepting units 113 of the three information acquiring apparatuses 11 receive the reproduced information. Next, the second reproduced information output units 114 output, from loudspeakers, the sound information forming the received reproduced information. Furthermore, the second reproduced information output units 114 output, on display screens, the video forming the received reproduced information. With this processing, the three music performers at remote locations can give music performances, while listening to the music that is listened to by the listeners and while feeling an atmosphere in the reproduction space.

Furthermore, the first reproduced information accepting units 131 of the three information output apparatuses 13 receive the reproduced information. Next, the first reproduced information output units 132 output, from loudspeakers, the sound information forming the received reproduced information. Furthermore, the first reproduced information output units 132 output, on display screens, the video forming the received reproduced information. With this processing, the viewers can listen to music information obtained by adding a value to synthesis music information, instead of listening to music information obtained by simple synthesizing. Furthermore, the viewers can listen to a music performance while feeling an atmosphere in the reproduction space.

Then, the above-described processing is repeated, until the music performance is ended, or until an instruction to abort the process is input from the information acquiring apparatuses 11, the information reproducing apparatus 21, the information aggregating apparatus 22, or the like.

As described above, according to this embodiment, it is possible to output information obtained by synthesizing information from two or more apparatuses that output information obtained by synthesizing information received from two or more remote locations and adding a value thereto.

In the specific example in this embodiment, there is no limitation on the type or content of information acquired by the information acquiring apparatuses 11, the type or content of reproduction source information, the method for synthesizing information, and the like.

Furthermore, the software that realizes the information aggregating apparatus in this embodiment may be the following sort of program. Specifically, this program is a program for causing a computer to function as: an acquired information receiving unit that receives at least one piece of information respectively from at least one information acquiring apparatus; a reproduced information collecting unit that receives at least one piece of reproduced information from at least one information reproducing apparatus; a reproduced information acquiring unit that acquires reproduced information that is to be output, using the at least one piece of information received by the acquired information receiving unit and the at least one piece of reproduced information received by the reproduced information collecting unit; and a reproduced information sending unit that transmits the reproduced information constructed by the reproduced information acquiring unit to the at least one information output apparatus, or to the at least one information output apparatus and the at least two information acquiring apparatuses.

In this program, it is preferable that the computer is caused to function such that reproduction source information, which is information for constructing reproduced information, is stored in a storage medium, and the reproduced information acquiring unit constructs reproduced information that is to be output, using the reproduction source information, the at least one piece of information received by the acquired information receiving unit, and the at least one piece of reproduced information received by the reproduced information collecting unit.

Furthermore, the software that realizes the information reproducing apparatus may be the following sort of program. Specifically, this program is a program using a storage medium in which reproduction source information, which is information for constructing reproduced information, is stored, the program causing a computer to function as: an acquired information receiving unit that receives at least one piece of information respectively from at least one information acquiring apparatus; a reproduced information acquiring unit that acquires reproduced information, using the at least one piece of information received by the acquired information receiving unit and the reproduction source information; and a reproduced information sending unit that transmits the reproduced information constructed by the reproduced information acquiring unit to the information aggregating apparatus.

Embodiment 3

In this embodiment, an information system will be described having an information synthesizing apparatus that constructs reproduced information that is to be output, by receiving information from two or more information reproducing apparatuses, and synthesizing the information.

Figure 12:
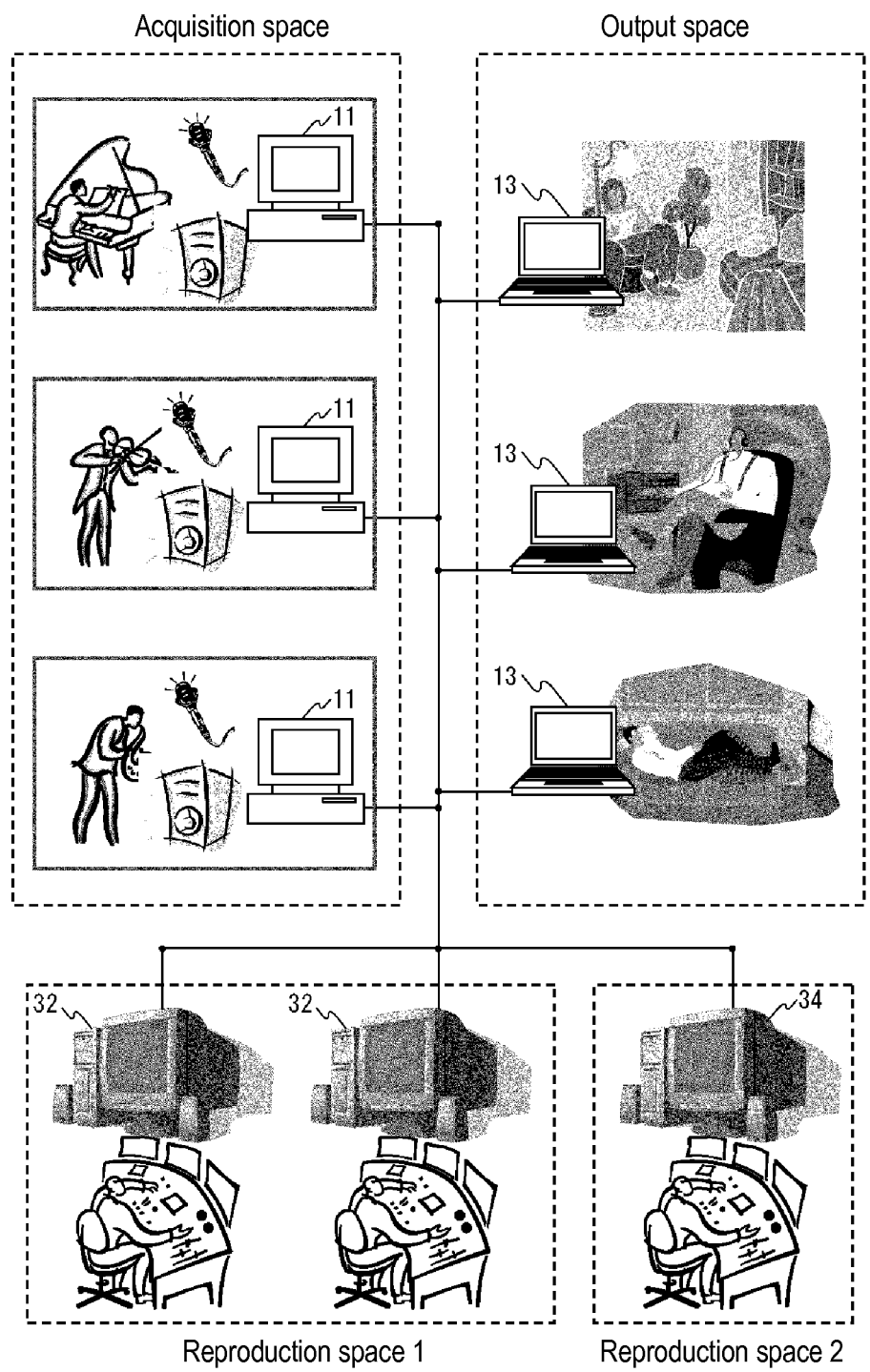
FIG. 12 is a conceptual diagram of an information system in Embodiment 3.

FIG. 12 is a conceptual diagram of an information system 3 in this embodiment. The information system 3 includes two or more information acquiring apparatuses 11, two or more information reproducing apparatuses 32, an information synthesizing apparatus 34, and one or more information output apparatuses 13.

Figure 13:
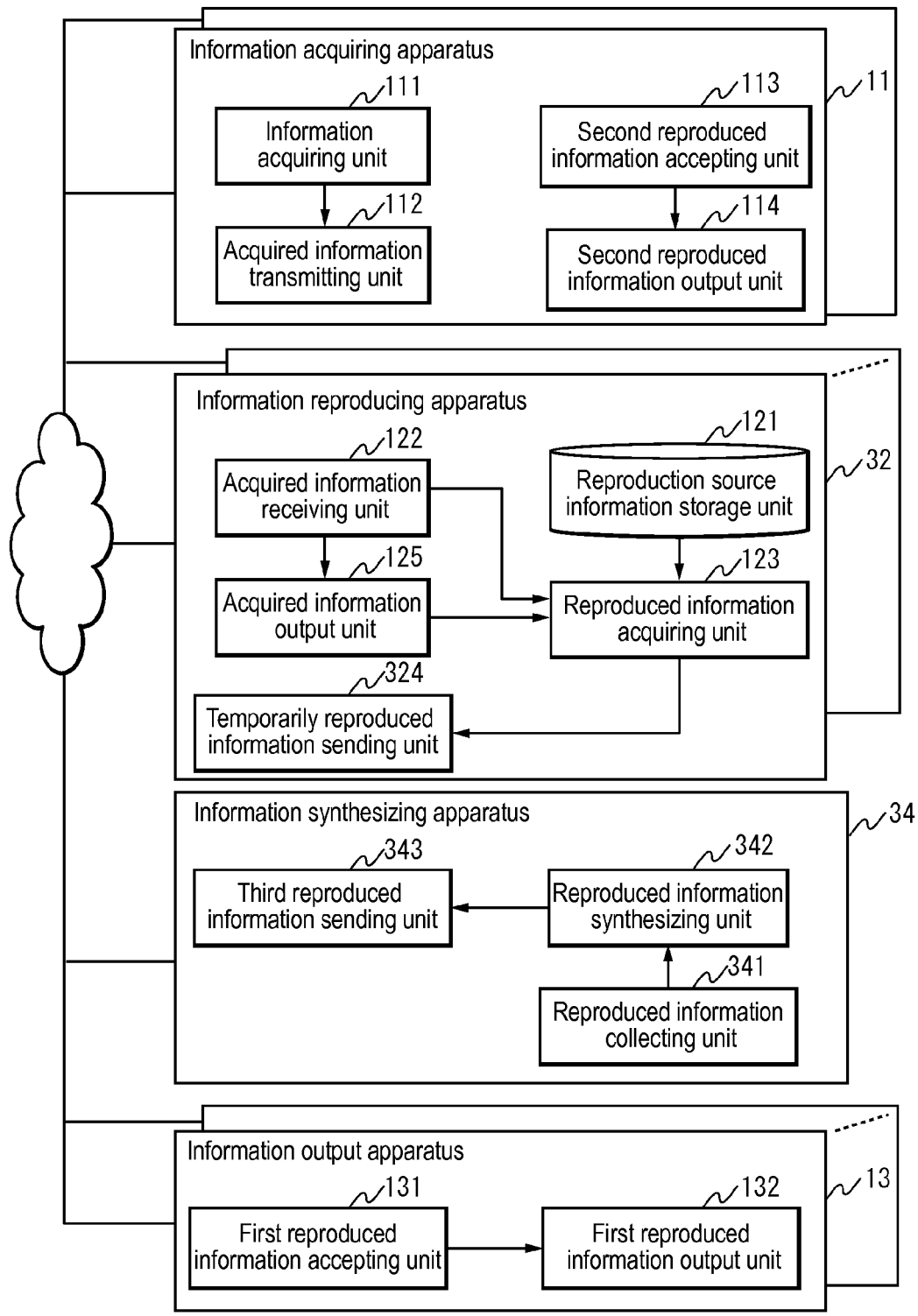
FIG. 13 is a block diagram of the information system in this embodiment.

FIG. 13 is a block diagram of the information system 3 in this embodiment.

The information reproducing apparatus 32 includes the reproduction source information storage unit 121, the acquired information receiving unit 122, the reproduced information acquiring unit 123, a temporarily reproduced information sending unit 324, and the acquired information output unit 125.

The information reproducing apparatus 32 may not include the reproduction source information storage unit 121.

The information synthesizing apparatus 34 includes a reproduced information collecting unit 341, a reproduced information synthesizing unit 342, and a third reproduced information sending unit 343.

The temporarily reproduced information sending unit 324 forming the information reproducing apparatus 32 transmits the reproduced information constructed by the reproduced information acquiring unit 123 to the information synthesizing apparatus 34. The temporarily reproduced information sending unit 324 is realized typically by a wireless or wired communication part, but may be realized also as a broadcasting part.

The reproduced information collecting unit 341 forming the information synthesizing apparatus 34 receives the reproduced information from the two or more information reproducing apparatuses 32. The reproduced information collecting unit 341 is realized typically by a wireless or wired communication part, but may be realized also as a broadcast receiving part.

The reproduced information synthesizing unit 342 constructs reproduced information that is to be output, by synthesizing the two or more pieces of reproduced information received by the reproduced information collecting unit 341. The method for synthesizing the reproduced information is, for example, the method described with reference to FIG. 11. The reproduced information synthesizing unit 342 may be realized typically by an MPU, a memory, or the like. Typically, the processing procedure of the reproduced information synthesizing unit 342 is realized by software, and the software is stored in a storage medium such as a ROM. Note that the processing procedure may be realized also by hardware (a dedicated circuit).

The third reproduced information sending unit 343 sends the reproduced information constructed by the reproduced information synthesizing unit 342 to the two or more information acquiring apparatuses 11 and the one or more information output apparatuses 13. The third reproduced information sending unit 343 is realized typically by a wireless or wired communication part, but may be realized also as a broadcasting part. Furthermore, the third reproduced information sending unit 343 may send information to the one or more information output apparatuses 13, by writing the information into one or more storage media.

Next, the operation of the information system 3 will be described. First, the operation of the information reproducing apparatus 32 will be described. The information reproducing apparatuses 32 is different from the information reproducing apparatus 12 in the destination to which the reproduced information is transmitted. Accordingly, the operation of the information reproducing apparatus 32 is substantially similar to that in FIG. 4, and is different therefrom in that, in step S404, the temporarily reproduced information sending unit 324 transmits the reproduced information to the information synthesizing apparatus 34.

Next, the operation of the information synthesizing apparatus 34 will be described with reference to the flowchart in FIG. 14. In the flowchart in FIG. 14, only steps different from those in the flowchart in FIG. 10 will be described.

(Step S1401) The reproduced information collecting unit 341 judges whether or not the reproduced information from the two or more information reproducing apparatuses 32 has been received. If the reproduced information has been received, the procedure advances to step S1003, and, if not, the procedure returns to step S1401.

Figure 14:
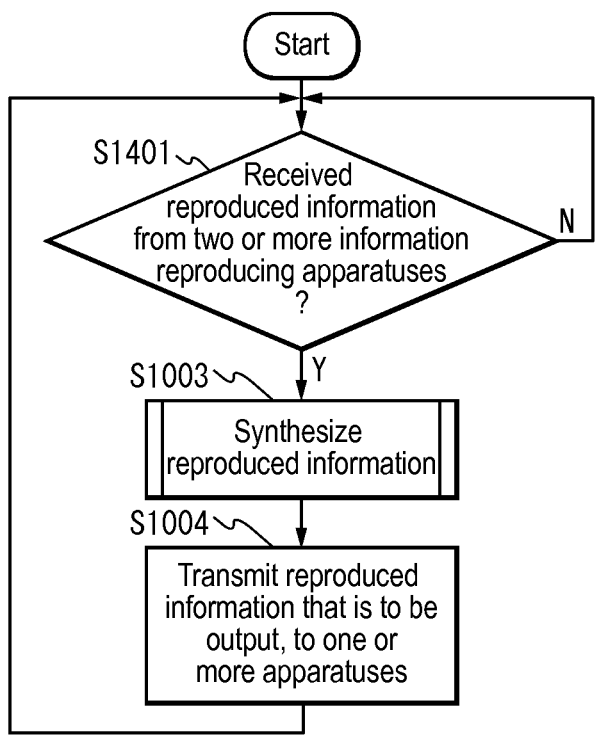
FIG. 14 is a flowchart illustrating the operation of an information synthesizing apparatus in this embodiment.

Note that the process is terminated by powering off or an interruption at completion of the process in the flowchart in FIG. 14.

Hereinafter, a specific operation of the information system 3 in this embodiment will be described. FIG. 12 is a conceptual diagram of the information system 3.

It is assumed that there are three acquisition spaces that are at remote locations. Furthermore, it is assumed that, in the first acquisition space, the music performer 1 plays the piano, and the first information acquiring apparatus 11 acquires sound information of the music obtained by playing the piano. Furthermore, it is assumed that, in the second acquisition space, the music performer 2 plays the violin, and the second information acquiring apparatus 11 acquires sound information of the music obtained by playing the violin. Furthermore, it is assumed that, in the third acquisition space, the music performer 3 plays the trumpet, and the third information acquiring apparatus 11 acquires sound information of the music obtained by playing the trumpet.

Furthermore, it is assumed that there are two information reproducing apparatuses 32. Then, the first information acquiring apparatus 11 and the second information acquiring apparatus 11 transmit information to a first information reproducing apparatus 32. Furthermore, it is assumed that a look-up table for converting music information of the piano and the violin (a type of sound information) is stored in the reproduction source information storage unit 121 of the first information reproducing apparatus 32.

Furthermore, it is assumed that the third information acquiring apparatus 11 transmits information to a second information reproducing apparatus 32. Furthermore, it is assumed that a look-up table for converting music information of the trumpet (a type of sound information) and video captured in the reproduction space are stored in the reproduction source information storage unit 121 of the second information reproducing apparatus 32.

Furthermore, it is assumed that there are three output spaces in which three viewers listen to a music performance obtained by synthesizing the music performances by the three music performers, and view video captured in the reproduction space.

In this situation, for example, the information synthesizing apparatus 34 transmits a trigger to start a music performance to the three information acquiring apparatuses 11, and the information acquiring apparatuses 11 receive the trigger and output a command to start a music performance to the respective acquisition spaces.

Then, the music performer 1, the music performer 2, and the music performer 3 play their respective musical instruments. Then, the information acquiring units 111 of the information acquiring apparatuses 11 in the respective acquisition spaces acquire sound information originated from the music performances. Next, the acquired information transmitting units 112 of the information acquiring apparatuses 11 in the first and the second acquisition spaces transmit the sound information to the first information reproducing apparatus 32. Furthermore, the acquired information transmitting unit 112 of the information acquiring apparatus 11 in the third acquisition space transmits the sound information to the second information reproducing apparatus 32.

Next, the acquired information receiving unit 122 of the first information reproducing apparatus 32 receives the sound information from the first and the second information acquiring apparatuses 11. Furthermore, the acquired information receiving unit 122 of the second information reproducing apparatus 32 receives the sound information from the third information acquiring apparatus 11.

Next, the reproduced information acquiring unit 123 of the first information reproducing apparatus 32 divides the sound information received from the first information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "first new sound information"), by applying the association information acquired for each processing unit.

Furthermore, the reproduced information acquiring unit 123 of the first information reproducing apparatus 32 divides the sound information received from the second information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "second new sound information"), by applying the association information acquired for each processing unit.

Next, the reproduced information acquiring unit 123 of the first information reproducing apparatus 32 synthesizes the first new sound information and the second new sound information in a time-synchronized manner. The sound information acquired by this synthesizing is the reproduced information that is to be transmitted to the information synthesizing apparatus 34.

Next, the temporarily reproduced information sending unit 324 of the first information reproducing apparatus 32 transmits the acquired reproduced information to the information synthesizing apparatus 34.

Next, the reproduced information acquiring unit 123 of the second information reproducing apparatus 32 divides the sound information received from the third information acquiring apparatus 11 into processing units, and acquires one or more feature amounts (feature amount vector) of each processing unit. Next, the reproduced information acquiring unit 123 acquires, from the look-up table, for each processing unit, association information associated with the feature amount vector with the smallest distance from the acquired feature amount vector of each processing unit. Then, the reproduced information acquiring unit 123 generates, for each processing unit, new sound information (which is referred to as "third new sound information"), by applying the association information acquired for each processing unit.

Next, the reproduced information acquiring unit 123 of the second information reproducing apparatus 32 constructs reproduced information containing the third new sound information and the video.

Next, the temporarily reproduced information sending unit 324 of the second information reproducing apparatus 32 transmits the acquired reproduced information to the information synthesizing apparatus 34.

Next, the reproduced information collecting unit 341 of the information synthesizing apparatus 34 receives the reproduced information from the two information reproducing apparatuses 32.

Then, the reproduced information synthesizing unit 342 of the information synthesizing apparatus 34 constructs reproduced information that is to be output, by synthesizing the two pieces of reproduced information. The reproduced information synthesizing unit 342 synthesizes sound information in the reproduced information transmitted from the first information reproducing apparatus 32 and the reproduced information transmitted from the second information reproducing apparatus 32. Then, the synthesis sound information (information obtained by synthesizing the music performances of the piano, the violin, and the trumpet) and the video in the reproduced information transmitted from the second information reproducing apparatus 32 are, for example, superimposed in a time-synchronized manner, and, thus, reproduced information that is to be output is constructed.

Next, the third reproduced information sending unit 343 of the information synthesizing apparatus 34 transmits the reproduced information acquired by the reproduced information synthesizing unit 342 to the three information acquiring apparatuses 11 and the three information output apparatuses 13.

Then, the second reproduced information accepting units 113 of the three information acquiring apparatuses 11 receive the reproduced information. Next, the second reproduced information output units 114 output, from loudspeakers, the sound information forming the received reproduced information. Furthermore, the second reproduced information output units 114 output, on display screens, the video forming the received reproduced information. With this processing, the three music performers at remote locations can give music performances, while listening to the music that is listened to by the listeners and while feeling an atmosphere in the reproduction space.

Furthermore, the first reproduced information accepting units 131 of the three information output apparatuses 13 receive the reproduced information. Next, the first reproduced information output units 132 output, from loudspeakers, the sound information forming the received reproduced information. Furthermore, the first reproduced information output units 132 output, on display screens, the video forming the received reproduced information. With this processing, the viewers can listen to music information obtained by adding a value to synthesis music information, instead of listening to music information obtained by simple synthesizing. Furthermore, the viewers can listen to a music performance while feeling an atmosphere in the reproduction space.

Then, the above-described processing is repeated, until the music performance is ended, or until an instruction to abort the process is input from the information acquiring apparatuses 11, the information reproducing apparatuses 32, the information synthesizing apparatus 34, or the like.

As described above, according to this embodiment, it is possible to output information obtained by synthesizing information from two or more apparatuses that output information obtained by synthesizing information received from two or more remote locations and adding a value thereto.

The software that realizes the information synthesizing apparatus 34 in this embodiment may be the following sort of program. Specifically, this program is a program for causing a computer to function as: a reproduced information collecting unit that receives reproduced information from each of at least two information reproducing apparatuses; a reproduced information synthesizing unit that constructs reproduced information that is to be output, by synthesizing the at least two pieces of reproduced information received by the reproduced information collecting unit; and a third reproduced information sending unit that transmits the reproduced information constructed by the reproduced information synthesizing unit to the at least one information output apparatus, or to the at least one information acquiring apparatus and the at least one information output apparatus.

Furthermore, the software that realizes the information reproducing apparatus 32 in this embodiment may be the following sort of program. Specifically, this program is a program using a storage medium in which reproduction source information, which is information for constructing reproduced information, is stored, the program causing a computer to function as: an acquired information receiving unit that receives at least one piece of information respectively from the at least one information acquiring apparatus; a reproduced information acquiring unit that constructs reproduced information, using the at least one piece of information received by the acquired information receiving unit and the reproduction source information; and a reproduced information sending unit that transmits the reproduced information constructed by the reproduced information acquiring unit to the information synthesizing apparatus.

Furthermore, the information system described in the foregoing embodiments can be applied, for example, as a remote music performance system, a remote theatrical performance system, and the like. If the information acquired by the information acquiring apparatuses 11 is music performance information of a musical instrument (sound information), the information system can be a remote music performance system. Furthermore, if the information acquired by the information acquiring apparatuses 11 is video obtained by capturing a play performed by a theatrical performer and acquired voice, the information system can be a remote theatrical performance system.

Figure 15:
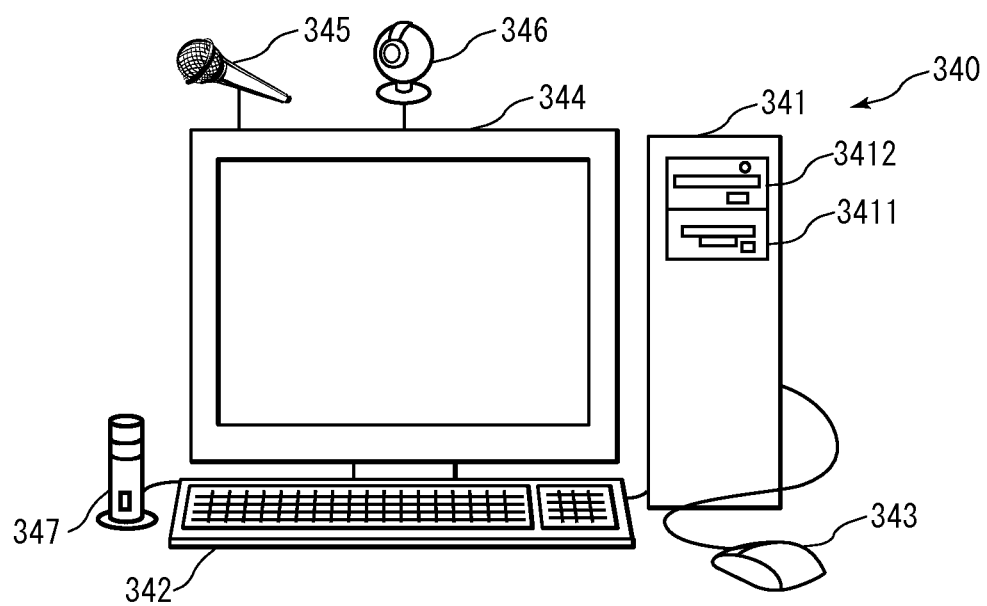
FIG. 15 is a schematic view of a computer system in the embodiments.
Figure 16:
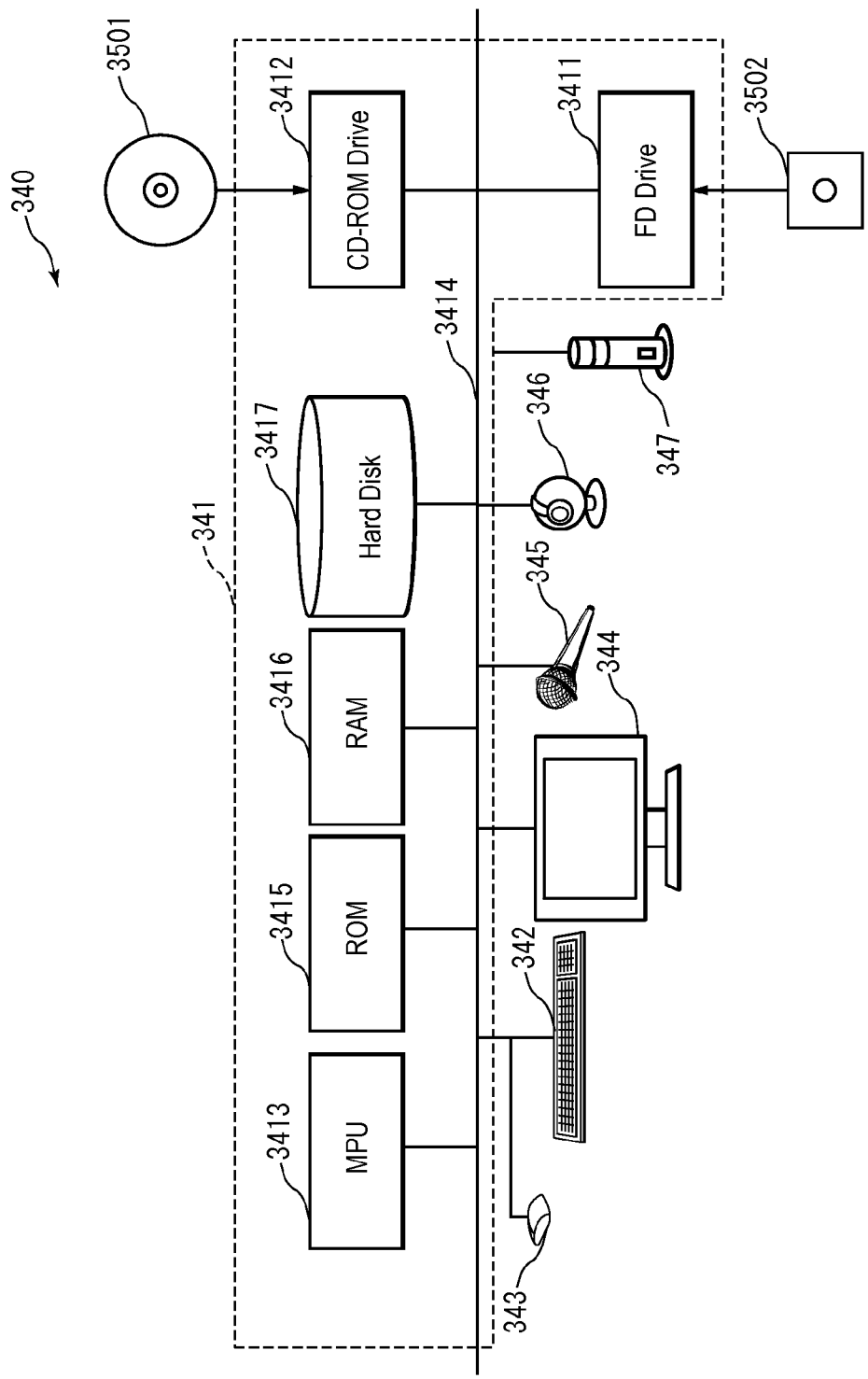
FIG. 16 is a block diagram of the computer system in the embodiments.

FIG. 15 shows the external appearance of a computer that executes the programs described in this specification to realize the information acquiring apparatus, the information reproducing apparatus, the information synthesizing apparatus, and the information output apparatus in the foregoing various embodiments. The foregoing embodiments may be realized using computer hardware and a computer program executed thereon. FIG. 15 is a schematic view of a computer system 340. FIG. 16 is a block diagram of the computer system 340.

In FIG. 15, the computer system 340 includes a computer 341 including an FD drive and a CD-ROM drive, a keyboard 342, a mouse 343, a monitor 344, a microphone 345, a camera 346, a loudspeaker 347, and the like.

In FIG. 16, the computer 341 includes not only the FD drive 3411 and the CD-ROM drive 3412, but also an MPU 3413, a bus 3414 that is connected to the MPU 3413, the CD-ROM drive 3412, and the FD drive 3411, a ROM 3415 in which a program such as a boot up program is to be stored, a RAM 3416 in which a command of an application program is temporarily stored and a temporary storage area is to be provided, and that is connected to the MPU 3413, and a hard disk 3417 in which an application program, a system program, and data are to be stored. Although not shown, the computer 341 may further include a network card that provides connection to a LAN.

The program for causing the computer system 340 to execute the functions of the information system in the foregoing embodiments may be stored in a CD-ROM 3501 or an FD 3502, inserted into the CD-ROM drive 3412 or the FD drive 3411, and transmitted to the hard disk 3417. Alternatively, the program may be transmitted via a network (not shown) to the computer 341 and stored in the hard disk 3417. At the time of execution, the program is loaded into the RAM 3416. The program may be loaded from the CD-ROM 3501 or the FD 3502, or directly from a network.

The program does not necessarily have to include, for example, an operating system (OS) or a third party program to cause the computer 341 to execute the functions of the information system in the foregoing embodiments. The program may only include a command portion to call an appropriate function (module) in a controlled mode and obtain the desired results. The manner in which the computer system 340 operates is well known, and, thus, a detailed description thereof has been omitted.

It should be noted that, in the program, in a step of transmitting information, a step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. More specifically, centralized processing may be performed, or distributed processing may be performed.

Furthermore, in the foregoing embodiments, it will be appreciated that two or more communication parts in one apparatus may be physically realized by one medium.

Furthermore, in the foregoing embodiments, each processing (each function) may be realized as integrated processing using a single apparatus (system), or may be realized as distributed processing using multiple apparatuses.

It will be appreciated that the present invention is not limited to the embodiments set forth herein, and various modifications are possible within the scope of the present invention.

INDUSTRIAL APPLICABILITY

As described above, the information system according to the present invention has an effect that this system can output information obtained by adding a value to information received from one or more remote locations, and, thus, this system is useful as a remote music performance system, a remote theatrical performance system, and the like.

LIST OF REFERENCE NUMERALS 1, 2, 3 Information system
11 Information acquiring apparatus
12, 21, 32 Information reproducing apparatus
13 Information output apparatus
22 Information aggregating apparatus
34 Information synthesizing apparatus
111 Information acquiring unit
112 Acquired information transmitting unit
113 Second reproduced information accepting unit
114 Second reproduced information output unit
121 Reproduction source information storage unit
122 Acquired information receiving unit
123, 222 Reproduced information acquiring unit
124 Reproduced information sending unit
214, 324 temporarily reproduced information sending unit
125 Acquired information output unit
131 First reproduced information accepting unit
132 First reproduced information output unit
221, 341 Reproduced information collecting unit
342 Reproduced information synthesizing unit
343 Third reproduced information sending unit
1231 Information synthesizing part
1232 Reproduced information constructing part

The invention claimed is:

1. An information system, comprising:
at least one information acquiring apparatus implemented using one or more processors coupled with a non-transitory memory that acquires information respectively from at least one acquisition space, wherein the acquired information comprises sound information originating from at least one music performance at the respective at least one acquisition space;
an information reproducing apparatus implemented using one or more processors coupled with a non-transitory memory that constructs reproduced information associated with a reproduction space, which is different from the acquisition space and is a space for reproducing the acquired information; and
at least one information output apparatus implemented using one or more processors coupled with a non-transitory memory that outputs the reproduced information to at least one output space, which is a space for outputting the reproduced information, wherein
the information acquiring apparatus includes:
an information acquiring unit that acquires information; and
an acquired information transmitting unit that transmits the information to the information reproducing apparatus,
the information reproducing apparatus includes:
a reproduction source information storage unit that stores reproduction source information, which is information for constructing reproduced information and which comprises a look-up table containing at least plurality pairs of mathematical expressions and pre-stored feature amount vectors for converting sound information to correspond to a particular performance space and for associating the whole or part of one or more pieces of first information with the whole or part of one or more pieces of second information, wherein the one or more pieces of first information are acquired in a first type of sound environment and the one or more pieces of second information are acquired in a second type of sound environment that is different from the first type of sound environment, each mathematical expression being associated with one of the pre-stored feature amount vectors;
an acquired information receiving unit that receives at least one piece of information respectively from the at least one information acquiring apparatus;
a reproduced information acquiring unit that acquires reproduced information, using the at least one piece of information received by the acquired information receiving unit and the reproduction source information, wherein the reproduced information acquiring unit
extracts one or more feature amounts from the at least one piece of information received by the acquired information receiving unit,
identifies from the look-up table, a pre-stored feature amount vector having the smallest distance from the extracted one or more feature amounts,
acquires, from the look-up table, an mathematical expression associated with the identified pre-stored feature amount vector,
generates further information by applying the acquired mathematical expression,
constructs reproduced information from the further information generated by applying the acquired mathematical expression; and
a reproduced information sending unit that transmits the reproduced information constructed by the reproduced information acquiring unit to the at least one information output apparatus, and
the information output apparatus includes:
a first reproduced information accepting unit that receives reproduced information from the information reproducing apparatus; and
a first reproduced information output unit that outputs the reproduced information received by the first reproduced information accepting unit.

2. The information system according to claim 1, comprising at least two information acquiring apparatuses, implemented using one or more processors coupled with a non-transitory memory, that acquire information respectively from at least two acquisition spaces, wherein the information reproducing apparatus includes:
an acquired information receiving unit that receives at least two pieces of information respectively from the at least two information acquiring apparatuses;
an acquired information output unit that outputs the at least two pieces of information received by the acquired information receiving unit;
a reproduced information acquiring unit that acquires reproduced information containing the at least two pieces of information output by the acquired information output unit; and
a reproduced information sending unit that transmits the reproduced information acquired by the reproduced information acquiring unit to the at least one information output apparatus.

3. The information system according to claim 1, wherein the information acquiring apparatus further includes:
a second reproduced information accepting unit that receives reproduced information from the information reproducing apparatus; and
a second reproduced information output unit that outputs the reproduced information received by the second reproduced information accepting unit, and
the reproduced information sending unit of the information reproducing apparatus transmits the reproduced information constructed by the reproduced information acquiring unit to the at least one information acquiring apparatus and the at least one information output apparatus.

4. The information system according to claim 1, comprising at least two information acquiring apparatuses implemented using one or more processors coupled with a non-transitory memory, wherein
the reproduced information acquiring unit includes:
an information synthesizing part that acquires synthesis information, by synthesizing at least two pieces of information received by the acquired information receiving unit; and
a reproduced information constructing part that constructs reproduced information, using the synthesis information acquired by the information synthesizing part and the reproduction source information.

5. The information system according to claim 1, comprising at least two information acquiring apparatuses implemented using one or more processors coupled with a non-transitory memory, at least one information reproducing apparatus implemented using one or more processors coupled with a non-transitory memory, one information aggregating apparatus implemented using one or more processors coupled with a non-transitory memory, and at least one information output apparatus implemented using one or more processors coupled with a non-transitory memory, wherein
the information aggregating apparatus includes:
an acquired information receiving unit that receives at least one piece of information respectively from at least one of the information acquiring apparatuses;
a reproduced information collecting unit that receives at least one piece of reproduced information from the at least one information reproducing apparatus;
a reproduced information acquiring unit that acquires reproduced information that is to be output, using the at least one piece of information received by the acquired information receiving unit and the at least one piece of reproduced information received by the reproduced information collecting unit; and
a reproduced information sending unit that transmits the reproduced information constructed by the reproduced information acquiring unit to the at least one information output apparatus, or to the at least one information output apparatus and the at least two information acquiring apparatuses, and
the reproduced information sending unit of the at least one information reproducing apparatus transmits the reproduced information constructed by the reproduced information acquiring unit of the information reproducing apparatus to the information aggregating apparatus.

6. The information system according to claim 5, wherein the information aggregating apparatus further includes a reproduction source information storage unit in which reproduction source information, which is information for constructing reproduced information, can be stored, and
the reproduced information acquiring unit of the information aggregating apparatus constructs reproduced information that is to be output, using the reproduction source information, the at least one piece of information received by the acquired information receiving unit, and the at least one piece of reproduced information received by the reproduced information collecting unit.

7. The information system according to claim 1, comprising at least two information acquiring apparatuses implemented using one or more processors coupled with a non-transitory memory, at least two information reproducing apparatuses implemented using one or more processors coupled with a non-transitory memory, an information synthesizing apparatus implemented using one or more processors coupled with a non-transitory memory, and at least one information output apparatus implemented using one or more processors coupled with a non-transitory memory, wherein
the reproduced information sending unit of each of the information reproducing apparatuses transmits the reproduced information constructed by the reproduced information acquiring unit to the information synthesizing apparatus, and
the information synthesizing apparatus includes:
a reproduced information collecting unit that receives reproduced information from each of the at least two information reproducing apparatuses;
a reproduced information synthesizing unit that constructs reproduced information that is to be output, by synthesizing the at least two pieces of reproduced information received by the reproduced information collecting unit; and
a third reproduced information sending unit that transmits the reproduced information constructed by the reproduced information synthesizing unit to the at least one information output apparatus, or to the at least two information acquiring apparatuses and the at least one information output apparatus.

8. The information system according to claim 1, wherein the information acquired by the information acquiring apparatus comprises video information.

9. The information system according to claim 1, wherein the information acquired by the information acquiring apparatus comprises trigger information for causing another apparatus to operate, and
the reproduced information acquiring unit of the information reproducing apparatus converts each of at least one piece of trigger information received by the acquired information receiving unit to outputtable information, and constructs reproduced information, using the at least one piece of converted information and the reproduction source information.

10. The information system according to claim 1, wherein the reproduced information acquiring unit acquires the whole or part of at least one piece of second information associated with the whole or part of the at least one piece of information received by the acquired information receiving unit, using the look-up table, and constructs reproduced information from the acquired whole or part of at least one piece of second information.

11. An information reproducing apparatus forming the information system according to claim 1.

12. An information reproducing apparatus comprising one or more processors coupled with a non-transitory memory configured to implement:
   a reproduction source information storage unit that stores reproduction source information, which is information for constructing reproduced information and which comprises a look-up table containing at least a plurality pairs of mathematical expression and pre-stored feature amount vectors for converting sound information to correspond to a particular performance space and for associating the whole or part of one or more pieces of first information with the whole or part of one or more pieces of second information, wherein the one or more pieces of first information are acquired in a first type of sound environment and the one or more pieces of second information are acquired in a second type of sound environment that is different from the first environment, each mathematical expression being associated with one of the pre-stored feature amount vectors;
   an acquired information receiving unit that receives at least one piece of information respectively from at least one information acquiring apparatus that acquires information respectively from at least one acquisition space, wherein the acquired information comprises sound information originating from at least one music performance at the respective at least one acquisition space;
   a reproduced information acquiring unit that acquires reproduced information, using the at least one piece of information received by the acquired information receiving unit and the reproduction source information, wherein the reproduced information acquiring unit
   extracts one or more feature amounts from the at least one piece of information received by the acquired information receiving unit,
   identifies, from the look-up table, a pre-stored feature amount vector having the smallest distance from the extracted one or more feature amounts,
   acquires, from the look-up table an mathematical expression associated with the identified pre-stored feature amount vector;
   generates further information by applying the acquired mathematical expression,
   constructs reproduced information from the further information generated by applying the red acquired mathematical expression; and
   a reproduced information sending unit that sends the reproduced information acquired by the reproduced information acquiring unit.

13. An information reproducing apparatus comprising one or more processors coupled with a non-transitory memory configured to implement:
   an acquired information receiving unit that receives at least two pieces of information respectively from at least two information acquiring apparatuses that acquire information from at least two different acquisition spaces, wherein the acquired information comprises sound information originating from at least two different music performances respectively at the at least two different acquisition spaces;
   an acquired information output unit that outputs the at least two pieces of information received by the acquired information receiving unit;
   a reproduced information acquiring unit that acquires reproduced information using reproduction source information, wherein the reproduced information contains the at least two pieces of information output by the acquired information output unit and wherein the reproduction source information is information for constructing reproduced information and comprises a look-up table containing a plurality pairs of mathematical expressions and pre-stored feature amount vectors for converting sound information to correspond to a particular performance space and for associating the whole or part of one or more pieces of first information with the whole or part of one or more pieces of second information, wherein the one or more pieces of first information are acquired in a first type of sound environment and the one or more pieces of second information are acquired in a second type of sound environment different than the first type of sound environment, each mathematical expression being associated with one of the pre-stored feature amount vectors, and
   wherein the reproduced information acquiring unit
   extracts one or more feature amounts from the information received by the acquired information receiving unit,
   identifies, from the look-up table, a pre-stored feature amount vector having the smallest distance from the extracted one or more feature amounts,
   acquires, from the look-up table an mathematical expression associated with the identified pre-stored feature amount vector,
   generates further information by applying the acquired mathematical expression,
   constructs reproduced information from the further information generated by applying the acquired o mathematical expression; and
   a reproduced information sending unit that sends the reproduced information acquired by the reproduced information acquiring unit.

14. The information reproducing apparatus according to claim 12, wherein
   the reproduced information sending unit transmits the reproduced information constructed by the reproduced information acquiring unit to the at least one information acquiring apparatus, or to the at least one information acquiring apparatus and at least one information output apparatus.

15. The information reproducing apparatus according to claim 13, wherein
   the reproduced information sending unit transmits the reproduced information constructed by the reproduced information acquiring unit to the at least two information acquiring apparatuses, or to the at least two information acquiring apparatuses and at least one information output apparatus.

16. The information system according to claim 1, wherein the at least one music performance is two or more music performances at two or more different respective acquisition spaces.

17. The information system according to claim 1, wherein at least one of the pre-stored feature amount vectors comprises at least one of a feature amount sound volume and a feature amount frequency.

* * * * *